United States Patent
Azuma

(10) Patent No.: US 12,555,976 B2
(45) Date of Patent: Feb. 17, 2026

(54) LASER DIODE ELEMENT AND METHOD FOR MANUFACTURING SAME

(71) Applicant: NICHIA CORPORATION, Anan (JP)

(72) Inventor: Naoki Azuma, Tokushima (JP)

(73) Assignee: NICHIA CORPORATION, Anan (JP)

(*) Notice: Subject to any disclaimer, the term of this patent is extended or adjusted under 35 U.S.C. 154(b) by 595 days.

(21) Appl. No.: 18/001,320

(22) PCT Filed: May 31, 2021

(86) PCT No.: PCT/JP2021/020671
§ 371 (c)(1),
(2) Date: Dec. 9, 2022

(87) PCT Pub. No.: WO2021/251191
PCT Pub. Date: Dec. 16, 2021

(65) Prior Publication Data
US 2023/0253761 A1    Aug. 10, 2023

(30) Foreign Application Priority Data

Jun. 12, 2020 (JP) ................................. 2020-102472
Dec. 24, 2020 (JP) ................................. 2020-214700

(51) Int. Cl.
*H01S 5/02* (2006.01)
*H01S 5/22* (2006.01)
*H01S 5/40* (2006.01)

(52) U.S. Cl.
CPC .............. *H01S 5/0202* (2013.01); *H01S 5/22* (2013.01); *H01S 5/4031* (2013.01)

(58) Field of Classification Search
CPC ......... H01S 5/0202; H01S 5/22; H01S 5/4031
See application file for complete search history.

(56) References Cited

U.S. PATENT DOCUMENTS 6,278,173 B1    8/2001  Kobayashi et al.
6,482,666 B1   11/2002  Kobayashi et al.
(Continued)

FOREIGN PATENT DOCUMENTS

JP    H11-251265 A    9/1999
JP    2002-319703 A  10/2002
(Continued)

OTHER PUBLICATIONS

International Search Report in PCT/JP2021/020671, dated Aug. 10, 2021.

*Primary Examiner* — James A Menefee
(74) *Attorney, Agent, or Firm* — Spencer Fane LLP

(57) ABSTRACT

A method for manufacturing a laser diode element includes preparing a stacked body including a nitride semiconductor substrate, a first conductivity type semiconductor layer, an active layer, and a second conductivity type semiconductor layer. Element regions are defined by planned cleavage lines and planned division lines. The stacked body defines protrusions each including first and second side surfaces, and a ridge. Lower ends of the first and second side surfaces are located below a lower surface of the active layer. A first distance from the first side surface to the ridge is different from a second distance from the second side surface to the ridge. The first distance is the same for all of the protrusions in the at least one of the element regions. The stack body is cleaved from the first side surface to the second side surface.

17 Claims, 18 Drawing Sheets

(56) References Cited

U.S. PATENT DOCUMENTS

| | | | |
|---|---|---|---|
| 2001/0013608 A1 | 8/2001 | Kobayashi et al. | |
| 2004/0089873 A1* | 5/2004 | Morimoto | H01S 5/22 |
| | | | 438/22 |
| 2004/0170203 A1 | 9/2004 | Tojo et al. | |
| 2006/0192209 A1 | 8/2006 | Maeda et al. | |
| 2006/0239321 A1 | 10/2006 | Kume et al. | |
| 2007/0237199 A1* | 10/2007 | Kashima | H01S 5/162 |
| | | | 372/50.121 |
| 2007/0264802 A1* | 11/2007 | Sakamoto | B82Y 20/00 |
| | | | 438/689 |
| 2009/0022191 A1* | 1/2009 | Masui | H01S 5/34333 |
| | | | 257/E21.001 |
| 2009/0111203 A1 | 4/2009 | Nakamura et al. | |
| 2009/0137098 A1* | 5/2009 | Sakamoto | H01S 5/22 |
| | | | 438/462 |
| 2016/0268775 A1 | 9/2016 | Eichler et al. | |
| 2019/0052062 A1* | 2/2019 | Loeffler | H01S 5/0208 |
| 2020/0021083 A1 | 1/2020 | Ikeda et al. | |
| 2020/0328324 A1* | 10/2020 | Müller | H01L 25/0753 |
| 2021/0016395 A1 | 1/2021 | Ikeda et al. | |

FOREIGN PATENT DOCUMENTS

| | | | | |
|---|---|---|---|---|
| JP | 2003-031905 A | | 1/2003 | |
| JP | 2003-069152 A | | 3/2003 | |
| JP | 2003174228 A | * | 6/2003 | |
| JP | 2005-268475 A | | 9/2005 | |
| JP | 2006-216772 A | | 8/2006 | |
| JP | 2006-310413 A | | 11/2006 | |
| JP | 2008-160070 A | | 7/2008 | |
| JP | 2008-186828 A | | 8/2008 | |
| JP | 2008-258341 A | | 10/2008 | |
| JP | 2009-111268 A | | 5/2009 | |
| JP | 2010-028020 A | | 2/2010 | |
| JP | 2010-192882 A | | 9/2010 | |
| JP | 2010199482 A | * | 9/2010 | |
| JP | 2011-003789 A | | 1/2011 | |
| JP | 2011-210885 A | | 10/2011 | |
| JP | 2019-129217 A | | 8/2019 | |
| WO | 2018/180952 A1 | | 10/2018 | |
| WO | 2019/193862 A1 | | 10/2019 | |

* cited by examiner

LASER DIODE ELEMENT AND METHOD FOR MANUFACTURING SAME

CROSS-REFERENCE TO RELATED APPLICATIONS

This is a U.S. national phase application of PCT/JP2021/020671, filed on Mar. 31, 2021, which claims priority to Japanese Patent Application No. 2020-102472, filed on Jun. 12, 2020, and Japanese Patent Application No. 2020-214700 filed on Dec. 24, 2020. The entire disclosures of Japanese Patent Application Nos. 2020-102472 and 2020-214700 are hereby incorporated herein by reference.

TECHNICAL FIELD

The present invention relates to a laser diode element and a method for manufacturing the same.

BACKGROUND ART

Japanese Unexamined Patent Application Publication No. 2006-216772 describes an optically integrated semiconductor light emitting device having a plurality of light emitting device structures on a nitride semiconductor substrate. In the semiconductor light emitting device of the above publication, the shape of the light emitting device structures is in line symmetry with respect to the center line of the semiconductor light emitting device. Also, the above publication describes a GaN substrate as an example of a nitride semiconductor substrate, and indicates that the end face of the semiconductor light emitting device is formed by cleaving the GaN substrate.

SUMMARY

The shape of the end face formed by cleavage sometimes varies with the shape of the stacked body including the nitride semiconductor substrate. In a laser diode element that emits a plurality of laser beams, the greater is the variation in the shape of the end face of the portion corresponding to the optical waveguide of each laser beam, the greater is the variation in the characteristics of the plurality of laser beams in a given laser diode element.

The present disclosure includes the following embodiments.

A method for manufacturing a laser diode element includes: preparing a stacked body; cleaving the stacked body along planned cleavage lines; and dividing the stacked body along the planned division lines. The stacked body includes a nitride semiconductor substrate, a first conductivity type semiconductor layer provided on the nitride semiconductor substrate, an active layer provided on the first conductivity type semiconductor layer, and a second conductivity type semiconductor layer provided on the active layer. The stacked body includes a plurality of element regions that are defined by a plurality of planned cleavage lines and a plurality of planned division lines intersecting the planned cleavage lines, in a top view. The stacked body defines a plurality of protrusions disposed in at least one of the element regions, each of the protrusions including a first side surface and a second side surface each extending between adjacent ones of the planned cleavage lines, and a ridge that is disposed between the first side surface and the second side surface in the top view, with a lengthwise direction of the ridge intersecting the planned cleavage lines. A lower end of the first side surface and a lower end of the second side surface are located below a lower surface of the active layer. In at least one of the protrusions, a first distance on one of the planned cleavage lines from the first side surface to the ridge is different from a second distance on the one of the planned cleavage lines from the second side surface to the ridge, in the top view. The first distance is the same for all of the protrusions in the at least one of the element regions. The cleaving proceeds from the first side surface to the second side surface at each of the protrusions.

A laser diode element includes a stacked body. The stack body includes a nitride semiconductor substrate, a first conductivity type semiconductor layer provided on the nitride semiconductor substrate, a plurality of active layers provided on the first conductivity type semiconductor layer, a plurality of second conductivity type semiconductor layers respectively provided on the active layers. The stacked body defines an end face on the light emitting side and an end face on the light reflecting side. The stacked body defines a plurality of protrusions each including a first side surface and a second side surface extending between the end face on the light emitting side and the end face on the light reflecting side, and a ridge disposed between the first side surface and the second side surface in a top view, with a lengthwise direction of the ridge intersecting the end face on the light emitting side. In each of the protrusions, a lower end of the first side surface and a lower end of the second side surface are located below a lower surface of the active layer. In each of the protrusions, in the top view, a first distance from the first side surface to the ridge at the end face on the light emitting side is different from a second distance from the second side surface to the ridge at the end face on the light emitting side. The first distance is the same for all of the protrusions.

With the above-mentioned embodiments, it is possible to obtain a laser diode element in which variation in the characteristics of a plurality of laser beams corresponding to a plurality of ridges is reduced.

DESCRIPTION OF EMBODIMENTS

Figure 1:
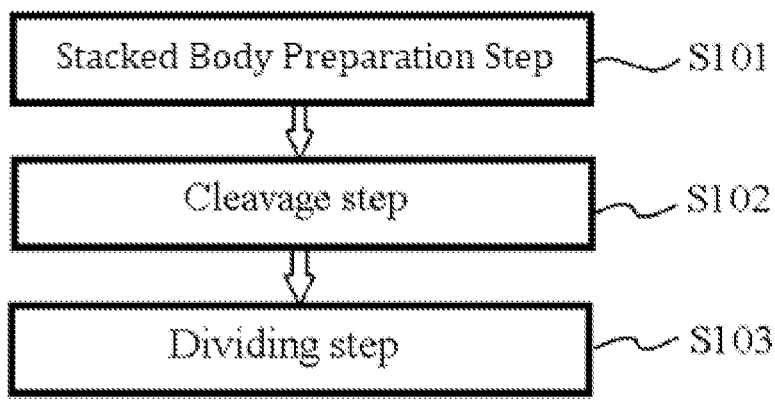
FIG. 1 is a flowchart showing the method for manufacturing a laser diode element according to an embodiment of the present invention.

An embodiment of the present invention will now be described with reference to the drawings. In the drawings, elements that are the same are numbered the same. Also, in each cross-sectional view, only the state of the cut surface is shown, and members not present on the cut surface are not shown.

FIG. 1 is a flowchart showing the method for manufacturing a laser diode element according to an embodiment of the present invention. As shown in FIG. 1, the method for manufacturing a laser diode element of the present embodiment includes a stacked body preparation step S101, a cleavage step S102, and a Dividing step S103. FIG. 2 to FIG. 12B are schematic views showing the method for manufacturing a laser diode element according to an embodiment of the present invention.

Stacked Body Preparation Step S101

Figure 2:
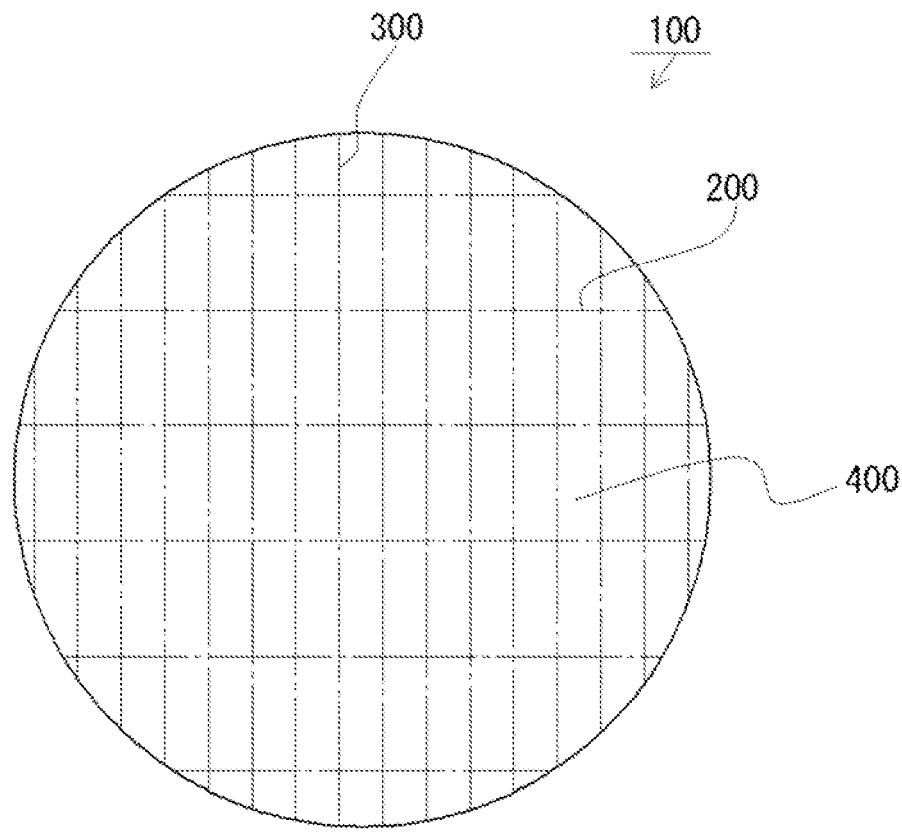
FIG. 2 is a schematic top view showing the method for manufacturing a laser diode element according to an embodiment of the present invention.

First, as shown in FIG. 2, a stacked body 100 is prepared. The stacked body 100 shown in FIG. 2 is a wafer. The stacked body 100 includes a plurality of element regions 400 that are defined in top view by a plurality of planned cleavage lines 200 and a plurality of planned division lines 300 intersecting the planned cleavage lines 200. In FIG. 2, the lines extending to the left and right in the drawing are the planned cleavage lines 200, and the lines extending in the vertical direction in the drawing are the planned division lines 300. The planned cleavage lines 200 and the planned division lines 300 are both virtual lines. The planned cleavage lines 200 and the planned division lines 300 intersect at a right angle, for example. In top view, the element regions 400 are rectangles, for example. In FIG. 2, the ends of all the planned cleavage lines 200 and the planned division lines 300 are aligned with the outer edge of the stacked body 100, when the planned cleavage lines 200 and/or the planned division lines 300 may be absent in portions that do not complete a laser diode element. The stacked body 100 may be a wafer as shown in FIG. 2, or may be a divided piece obtained by dividing the wafer into a plurality of pieces.

Figure 3:
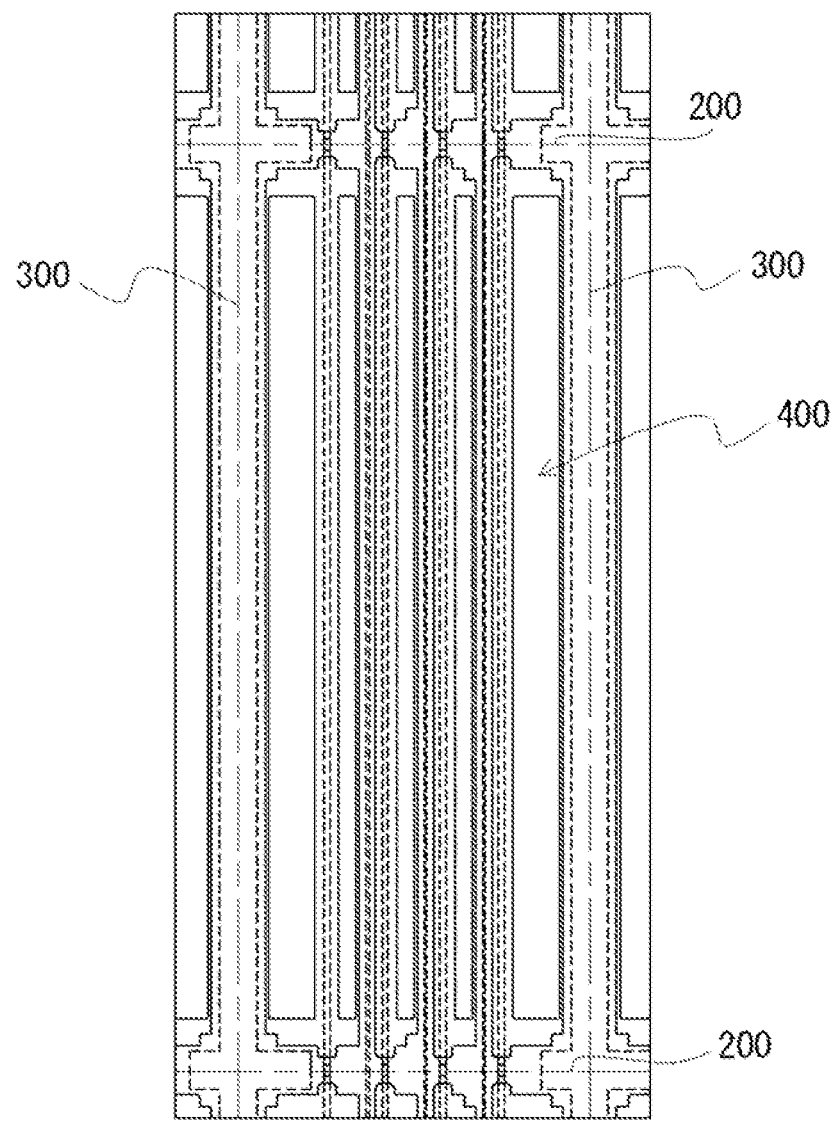
FIG. 3 is a schematic top view of a stacked body showing a partial enlarged portion of the stacked body.

FIG. 3 is a schematic top view of a stacked body showing a partial enlarged portion of the stacked body. The pattern as shown in FIG. 3 is disposed in each of the element regions 400. In FIG. 3, all of the element regions 400 have the same pattern. Some of the element regions 400 may, however, have a different pattern.

Figure 4A:
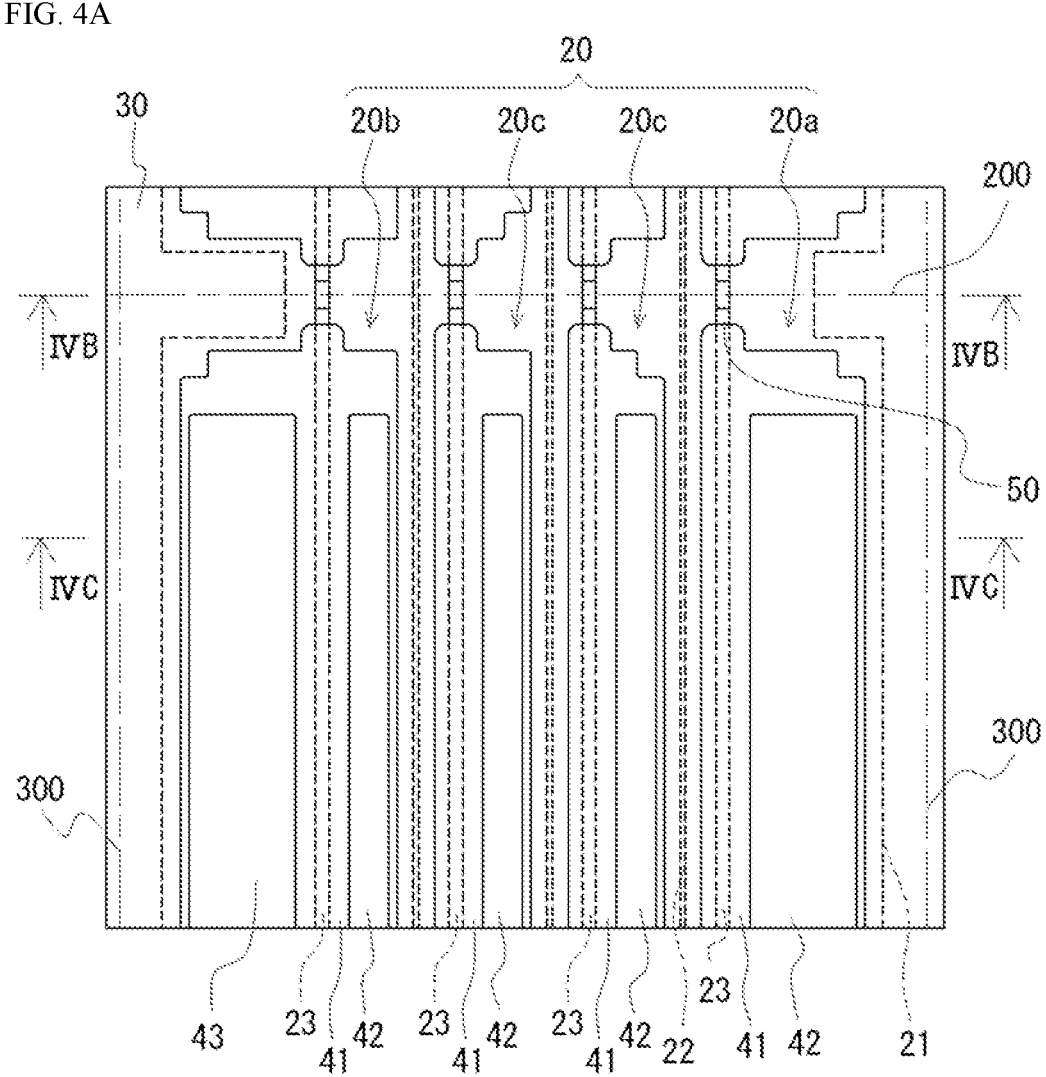
FIG. 4A is a partial enlarged view of FIG. 3.
Figure 4B:
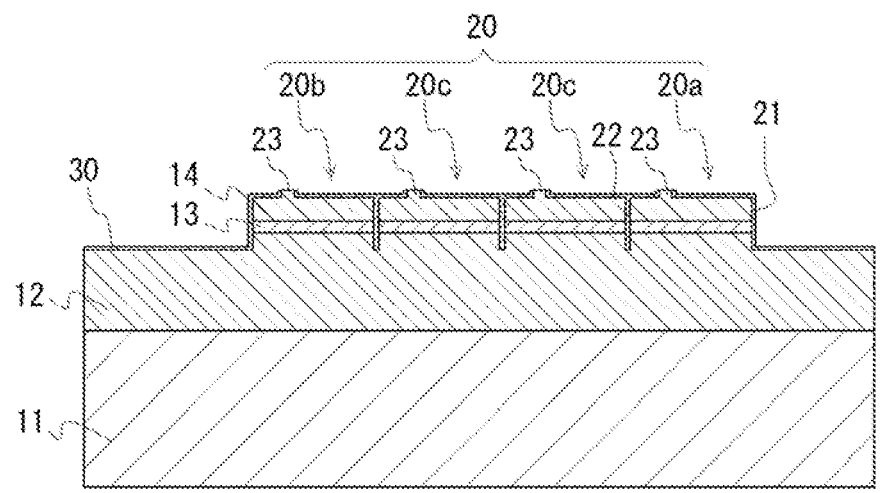
FIG. 4B is a cross-sectional view along the line IVB-IVB of FIG. 4A.
Figure 4C:
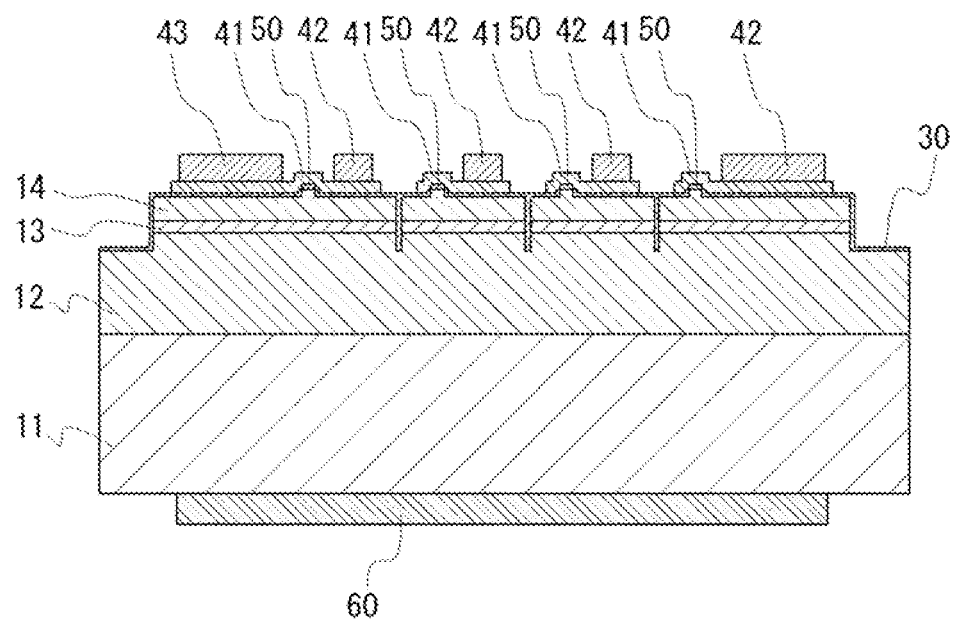
FIG. 4C is a cross-sectional view along the line IVC-IVC of FIG. 4A.

FIG. 4A is a partial enlarged view of FIG. 3; FIG. 4B is a cross-sectional view along the line IVB-IVB of FIG. 4A; FIG. 4C is a cross-sectional view along the line IVC-IVC of FIG. 4A. The line IVB-IVB in FIG. 4A coincides with a planned cleavage line 200. That is, FIG. 4B is a cross-sectional view along a planned cleavage line 200.

As shown in FIG. 4A to FIG. 4C, the stacked body 100 includes a nitride semiconductor substrate 11, a first conductivity type semiconductor layer 12, an active layer 13, and a second conductivity type semiconductor layer 14. The first conductivity type semiconductor layer 12 is provided on the nitride semiconductor substrate 11. The active layer 13 is provided on the first conductivity type semiconductor layer 12. The second conductivity type semiconductor layer 14 is provided on the active layer 13.

For example, a GaN substrate is prepared as the nitride semiconductor substrate 11. The readily cleavable plane of a nitride semiconductor having a Wurtzite structure, such as GaN and the like, is the m-plane (that is, the {10-10} plane). In this case, the planned cleavage lines 200 preferably coincide with the m-plane in top view. Consequently, cleavage can be performed very precisely along the planned cleavage lines 200. In this disclosure, the expression "coincide with the m-plane" is not limited to the case of exactly coinciding with the m-plane, and also includes a case in which the angle with respect to m-plane is 0.1 degree or less. For example, the upper surface of the nitride semiconductor substrate 11 may be the c-plane (that is, the (0001) plane or the (000-1) plane), and the planned cleavage lines 200 are made to coincide with the m-plane. In this disclosure, the c-plane is not limited to a plane that exactly coincides with the (0001) plane or the (000-1) plane, and also includes planes having an off angle within the range of ±0.03 to 1 degree. The shape of the nitride semiconductor substrate 11 is circular in top view, for example. A substrate having an orientation flat (OF) may be used as the nitride semiconductor substrate 11. If the nitride semiconductor substrate 11 is a substrate having an OF, the planned cleavage lines 200 can be aligned with the m-plane by using the OF as a reference.

The semiconductor constituting the first conductivity type semiconductor layer 12, the active layer 13, and the second conductivity type semiconductor layer 14 can be a nitride semiconductor, an example being a group III nitride semiconductor. Examples of group III nitride semiconductors include GaN, InGaN, and AlGaN. If the first conductivity type semiconductor layer 12 is epitaxially grown on the nitride semiconductor substrate 11, and then the active layer 13 and the second conductivity type semiconductor layer 14 are epitaxially grown, their crystal orientations will be substantially the same. Consequently, the planned cleavage lines 200 will coincide with the m-plane of the nitride semiconductor substrate 11, and therefore will also coincide with the m-plane of the active layer 13 and the like above this. The first conductivity type semiconductor layer 12 is an n-type semiconductor layer, for example. The second conductivity type semiconductor layer 14 is a p-type semiconductor layer, for example. The nitride semiconductor substrate 11, the first conductivity type semiconductor layer 12, the active layer 13, and the second conductivity type semiconductor layer 14 may be in direct contact with each other, or another semiconductor layer may be disposed in between them. For example, an undoped layer may be disposed between the second conductivity type semiconductor layer 14 and the active layer 13. The active layer 13 can have a multiple quantum well structure or a single quantum well structure. Examples of the plurality of semiconductor layers formed on the nitride semiconductor substrate 11 include an n-side clad layer, an n-side optical guide layer, the active layer 13, a p-side electron confinement layer, a p-side optical guide layer, a p-side clad layer, and a p-side contact layer, in that order starting from the nitride semiconductor substrate 11 side. For example, the n-side clad layer is the first conductivity type semiconductor layer 12, and the p-side clad layer is the second conductivity type semiconductor layer 14. The plurality of semiconductor layers including the first conductivity type semiconductor layer 12, the active layer 13, and the second conductivity type semiconductor layer 14 can be formed, for example, by metal organic chemical vapor deposition (MOCVD).

Each of the plurality of element regions 400 includes a plurality of protrusions 20. The number of protrusions 20 included in a single element region 400 is two or more, and may be three or more. In the case of three or more, the protrusions 20 in one element region 400 will include a first protrusion 20a, a second protrusion 20b, and one or more intermediate protrusions 20c. The first protrusion 20a is located on the side where the cleavage begins. The second protrusion 20b is located on the side where the cleavage ends. In FIG. 4A to FIR. 4C, the right side in the drawing is the side where the cleavage begins, and the left side in the drawing is the side where the cleavage ends. That is, in the cleavage step (discussed below), cleavage proceeds from right to left in the drawing. The intermediate protrusions 20c are located between the first protrusion 20a and the second protrusion 20b. The number of intermediate protrusions is two, for example.

The protrusions 20 each have a first side surface 21, a second side surface 22, and a ridge 23. The first side surface 21 and the second side surface 22 are surfaces connecting the two planned cleavage lines 200 that definition a single element region 400. In top view, the first side surface 21 and the second side surface 22 are connected to each other via two planned cleavage lines 200. In top view, the outer edge of one protrusion 20 is constituted by two planned cleavage lines 200, the first side surface 21, and the second side surface 22. The first side surface 21 and the second side surface 22 may be inclined with respect to the upper surface of the protrusion 20, in which case the outer edge of the protrusion 20 can be defined using the upper end of the first side surface 21 and the upper end of the second side surface 22. In each of the protrusions 20 shown in FIG. 4A to FIG. 4C, the side surface on the right side in the drawing is the first side surface 21, and the side surface on the left side in the drawing is the second side surface 22.

The ridges 23 are disposed between the first side surface 21 and the second side surface 22 in top view. In top view, the lengthwise direction of the ridges 23 is a direction that intersects the planned cleavage lines 200. That is, the ridges 23 have a long shape, and their lengthwise direction is a direction that intersects the planned cleavage lines 200. The lengthwise direction of the ridges 23 may be parallel to the planned division lines 300. The ridges 23 are in the form of stripes, for example. An optical waveguide can be defined by the ridges 23. For example, the portion of the active layer 13 directly below the ridges 23 and the peripheral portion thereof can be an optical waveguide. Since one element region 400 has a plurality of ridges 23, the laser diode element thus obtained has a plurality of optical waveguides. The ridges 23 are formed one for each protrusion 20, for example. Consequently, in the laser diode element thus obtained, drive control of the plurality of optical waveguides can be carried out independently. The ridges 23 are formed, for example, on part of the upper surface of the second conductivity type semiconductor layer 14. The protrusions 20 including the ridges 23 can be formed by removing a part of the semiconductor layers on the nitride semiconductor substrate 11 by using photolithography and etching, for example.

The lower end of the first side surface 21 and the lower end of the second side surface 22 are located below the lower surface of the active layer 13. Consequently, since the active layer 13 of the plurality of protrusions 20 is divided, in the resulting laser diode element each of the plurality of optical waveguides corresponding to the protrusions 20 can be driven individually. Also, since the lower end of the first side surface 21 is located below the lower surface of the active layer 13, the end face constituting a part of the optical waveguide is formed by cleavage starting from the first side surface 21 in the cleavage step (discussed below). Therefore, the shape of the protrusion 20 can affect the shape of the end face constituting a part of the optical waveguide. The lower end of the first side surface 21 and the lower end of the second side surface 22 are located, for example, in the first conductivity type semiconductor layer 12. The upper end of the first side surface 21 and the upper end of the second side surface 22 are located, for example, in the second conductivity type semiconductor layer 14. The second conductivity type semiconductor layer 14 is disposed on each of the plurality of protrusions 20. The second conductivity type semiconductor layer 14 on one protrusion 20 and the second conductivity type semiconductor layer 14 on another protrusion 20 are not linked and are separated from each other. In other words, one element region 400 can be said to include a plurality of second conductivity type semiconductor layers 14. Thus dividing the second conductivity type semiconductor layer 14 makes it possible to independently control the drive of each of the plurality of protrusions 20.

As shown in FIGS. 4A and 4B, the distance between the first protrusion 20a and the planned division line 300 can be made shorter than the distance between the second protrusion 20b and the planned division line 300 on the planned cleavage line 200. This asymmetry in distance can be used to distinguish between the portion on the light emitting side and the portion on the light reflecting side. Also, this asymmetry in distance can be used to distinguish between the end face on the light emitting side and the end face on the light reflecting side in the laser diode element after separation into individual pieces.

Figure 5A:
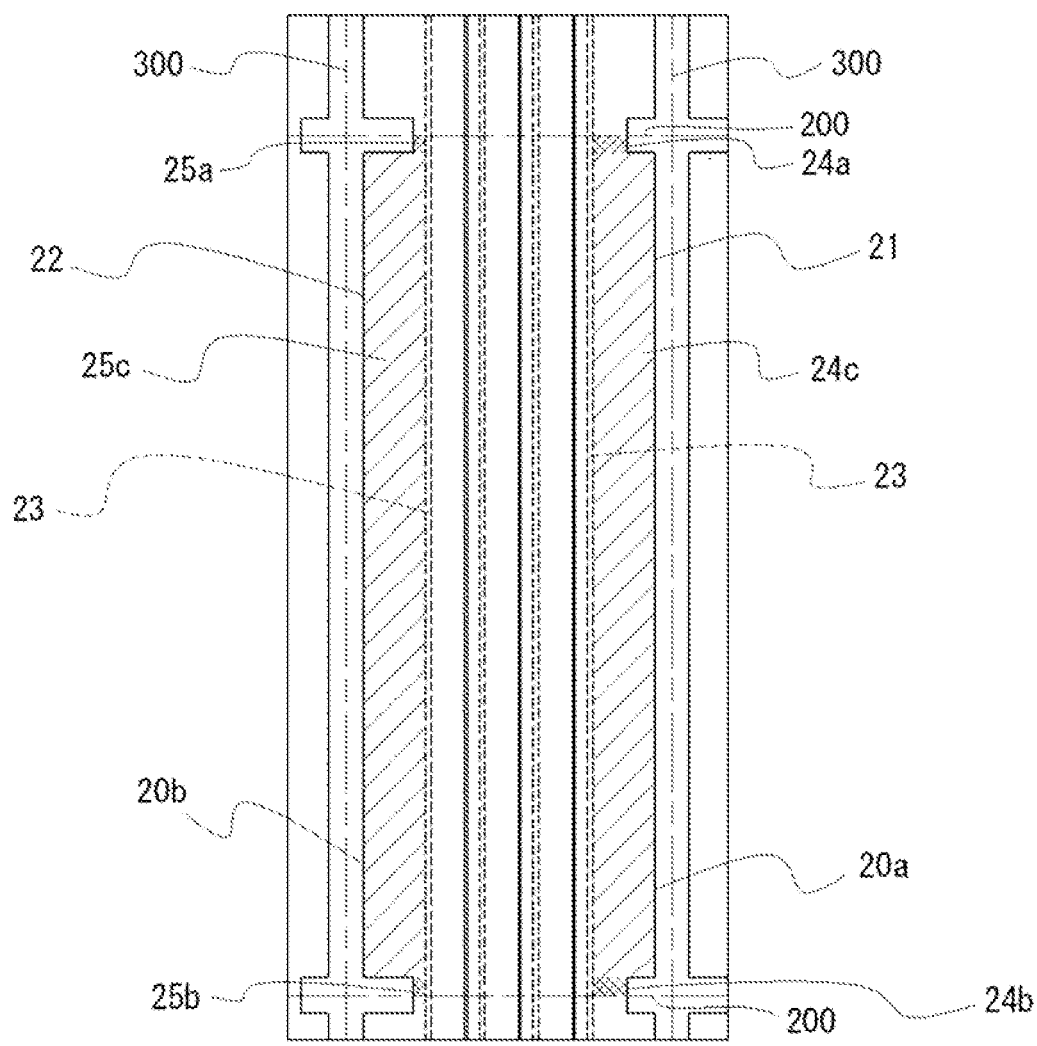
FIG. 5A is a schematic top view illustrating the shape of the protrusions.
Figure 5B:
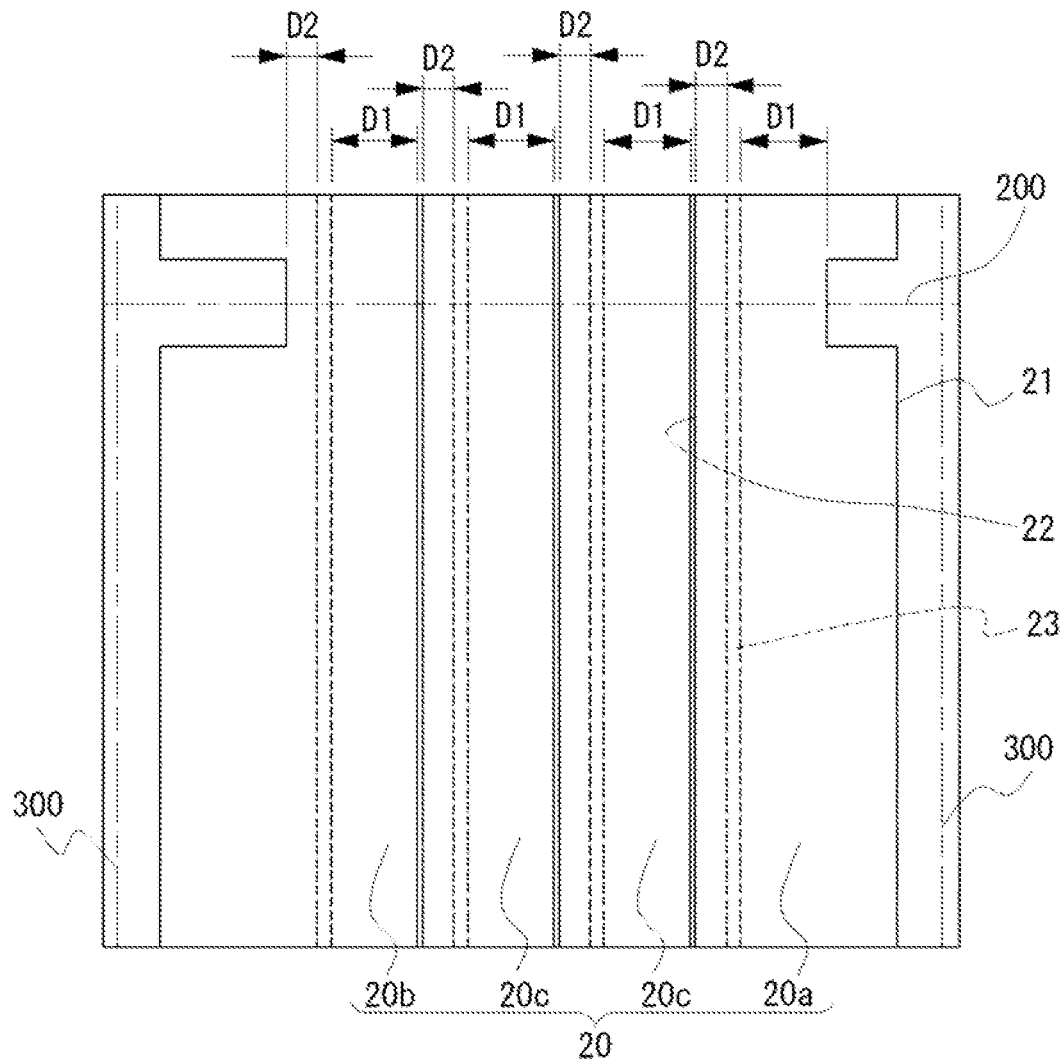
FIG. 5B is a schematic top view illustrating the shape of the protrusions.

FIG. 5A and FIG. 5B are schematic top views illustrating the shape of the protrusions. FIG. 5A is a view showing only the protrusions 20, the ridges 23, the planned cleavage lines 200, and the planned division lines 300 in the same region as FIG. 3, and FIG. 5B showing these in the same region as FIG. 4A. In FIG. 5B, the protrusions 20 are indicated by solid lines, and the ridges 23 are indicated by broken lines. As shown in FIG. 5B, a first distance D1 from the first side surface 21 to the ridge 23 on a planned cleavage line 200 is different from a second distance D2 from the second side surface 22 to the ridge 23 on a planned cleavage line 200 in top view. The plurality of first distances D1 in one element region 400 are all equal. In FIG. 5B, there are four first distances D1, all of which are equal.

By making the first distances D1 equal, the distance from the start of cleavage in each protrusion 20 to the portion corresponding to the optical waveguide can be made more uniform in the cleavage step discussed below. It is believed that this makes it possible for the shape of the end face formed in the cleavage step (discussed below) to be made more uniform in the portion corresponding to the optical waveguide of each protrusion 20. As a result, variation in the characteristics of the plurality of laser beams corresponding to the plurality of ridges of the obtained laser diode element can be reduced. Also, variation between the laser diode elements can be reduced. It should be noted that the phrase "the first distances D1 are equal" not only means that the first distances D1 are exactly the same, and also encompasses a difference of 1 µm or less between the smallest first distance D1 and the largest first distance D1.

Since the second distance D2 is the distance from the ridge 23 to the second side surface 22 in the cleavage direction, the influence that the portion corresponding to the optical waveguide has on cleavage is believed to be less than that of the first distance D1. Therefore, the plurality of second distances D2 in a single element region 400 need not be equal. In FIG. 5B, the second distances D2 are all equal. Making all of the second distances D2 equal is believed to make it possible for the shape of the end face formed in the cleavage step to be more uniform.

When the first side surface 21 and the ridge 23 are close to each other, the flatness of the portion of the end face formed in the cleavage step immediately below the ridge 23 may suffer. Therefore, the first distance D1 is preferably 20 µm or more. On the other hand, the above-mentioned effect of having all the first distances D1 be the same is more easily obtained the closer the first side surface 21 and the ridge 23 are together. Therefore, the first distance D1 is preferably less than 80 µm, and more preferably 50 µm or less. Also, the first distance D1 is preferably greater than the second distance D2. This allows the width of the protrusion 20 in the direction running along the planned cleavage line 200 to be reduced while still obtaining the effect of having the first distances D1 be uniform. Reducing the width of the protrusion 20 makes it possible to reduce the width of the obtained laser diode element. The second distance D2 can be 5 µm or more. The second distance D2 can be less than 50 µm, and is preferably less than 20 µm. This makes it possible for the laser diode element to be made more compact.

The width of the protrusion 20 in the direction along the planned cleavage line 200 can be 20 µm or more, for example. The shortest distance between two adjacent protrusions 20 in one element region 400 can be 1 µm or more, for example, and is preferably 2 µm or more. This reduces the possibility of short-circuiting between adjacent protrusions 20. The distance between protrusions 20 refers to the distance between the outer edge of one protrusion 20 and the outer edge of the other protrusion 20 in top view. In order to further reduce the possibility of a short circuit, it is preferable to provide an insulating film 30 on the side surfaces of the protrusions 20 as shown in FIGS. 4B and 4C. The width of a protrusion 20 in the direction running along the planned cleavage line 200 can be 150 µm or less, and can be 50 µm or less. This makes it possible for the laser diode element to be more compact.

In top view, a protrusion 20 has a first region located on the side of the first side surface 21, and a second region located on the side of the second side surface 22, with a ridge 23 serving as a boundary. The protrusion 20 may have an outer portion and an inner portion having different widths in the direction running along the planned cleavage line 200. The outer portion is the portion of the protrusion 20 through which the planned cleavage line 200 passes. The inner portion is located between the two outer portions through which pass two planned cleavage lines 200 that define one element region 400.

As shown in FIG. 5A, the first region of the first protrusion 20a has a first outer portion 24a through which one of the planned cleavage lines 200 passes, and a second outer portion 24b through which another of the planned cleavage lines 200 passes. The first region of the first protrusion 20a further has a first inner portion 24c located between the first outer portion 24a and the second outer portion 24b. In FIG. 5A, the first outer portion 24a and the second outer portion 24b are indicated by cross-hatching, and the first inner portion 24c is indicated by diagonal hatching. Regarding the width in the direction running along the planned cleavage lines 200, the width of the first inner portion 24c is greater than the width of the first outer portion 24a and the width of the second outer portion 24b. Since the width of the first region of the first protrusion 20a does not affect the distance between adjacent ridges 23 in one element region 400, this wide first inner portion 24c may be provided to the first region of the first protrusion 20a. In FIG. 5A, the first region of the first protrusion 20a consists only of the first outer portion 24a, the second outer portion 24b, and the first inner portion 24c. The first region of the first protrusion 20a may have a portion other than these. The first protrusion 20a does not have to have the first inner portion 24c. The top view shape of the first protrusion 20a may be the same as the top view shape of the intermediate protrusion 20c.

Regarding the length of the ridge 23 in the lengthwise direction, the length of the first inner portion 24c is greater than the length of each of the first outer portion 24a and the second outer portion 24b. Also, this length is greater than the combined length of the first outer portion 24a and the second outer portion 24b. This allows the first inner portion 24c to be used as a portion where the first conductive layer 41 is mainly provided. The length of the first inner portion 24c can be half or more of the length of the ridge 23, and may be 95% or more. The length of the first inner portion 24c can be made less than the length of the ridge 23, and may be 98% or less.

The second region of the second protrusion 20b has a third outer portion 25a through which one of the planned cleavage lines 200 passes, and a fourth outer portion 25b through which another of the planned cleavage lines 200 passes. The second region of the second protrusion 20b further has a second inner portion 25c located between the third outer portion 25a and the fourth outer portion 25b. In FIG. 5A, the third outer portion 25a and the fourth outer portion 25b are indicated by cross-hatching, and the second inner portion 25c is indicated by diagonal hatching. Regarding the width in the direction running along the planned cleavage lines 200, the width of the second inner portion 25c is greater than the width of the third outer portion 25a and the width of the fourth outer portion 25b. For the same reason as with the first region of the first protrusion 20a, this wide second inner portion 25c may be provided in the second region of the second protrusion 20b. In FIG. 5A, the second region of the second protrusion 20b consists only of the third outer portion 25a, the fourth outer portion 25b, and the second inner portion 25c. The second region of the second protrusion 20b may have a portion other than these. The second protrusion 20b does not have to have the second inner portion 25c. In that case, the third conductive layer 43 discussed below need not be provided. The top view shape of the second protrusion 20b may be the same as the top view shape of the intermediate protrusion 20c.

Regarding the length of the ridge 23 in the lengthwise direction, the length of the second inner portion 25c is greater than the length of each of the third outer portion 25a and the fourth outer portion 25b, and this length is greater than the combined length of the third outer portion 25a and the fourth outer portion 25b. This allows the second inner portion 25c to be used as a portion where the first conductive layer 41 is mainly provided. The length of the second inner portion 25c can be half or more of the length of the ridge 23, and may be 95% or more. The length of the second inner portion 25c can be made less than the length of the ridge 23, and may be 98% or less.

The region in which the first outer portion 24a and the third outer portion 25a are provided and which is sandwiched between the first outer portion 24a of one element region 400 and the third outer portion 25a of another element region 400 that is opposite the one element region 400 may be used as a region for forming a groove in the cleavage step discussed below. One element region 400 and another element region 400 are, for example, two element regions 400 disposed side by side in the horizontal direction in FIG. 5A. Also, a region in which the second outer portion 24b and the fourth outer portion 25b are provided and which is sandwiched between the second outer portion 24b of one element region 400 and the fourth outer portion 25b of another element region 400 that is opposite the one element region 400 may be used as a region for forming a groove in the cleavage step discussed below.

Figure 6A:
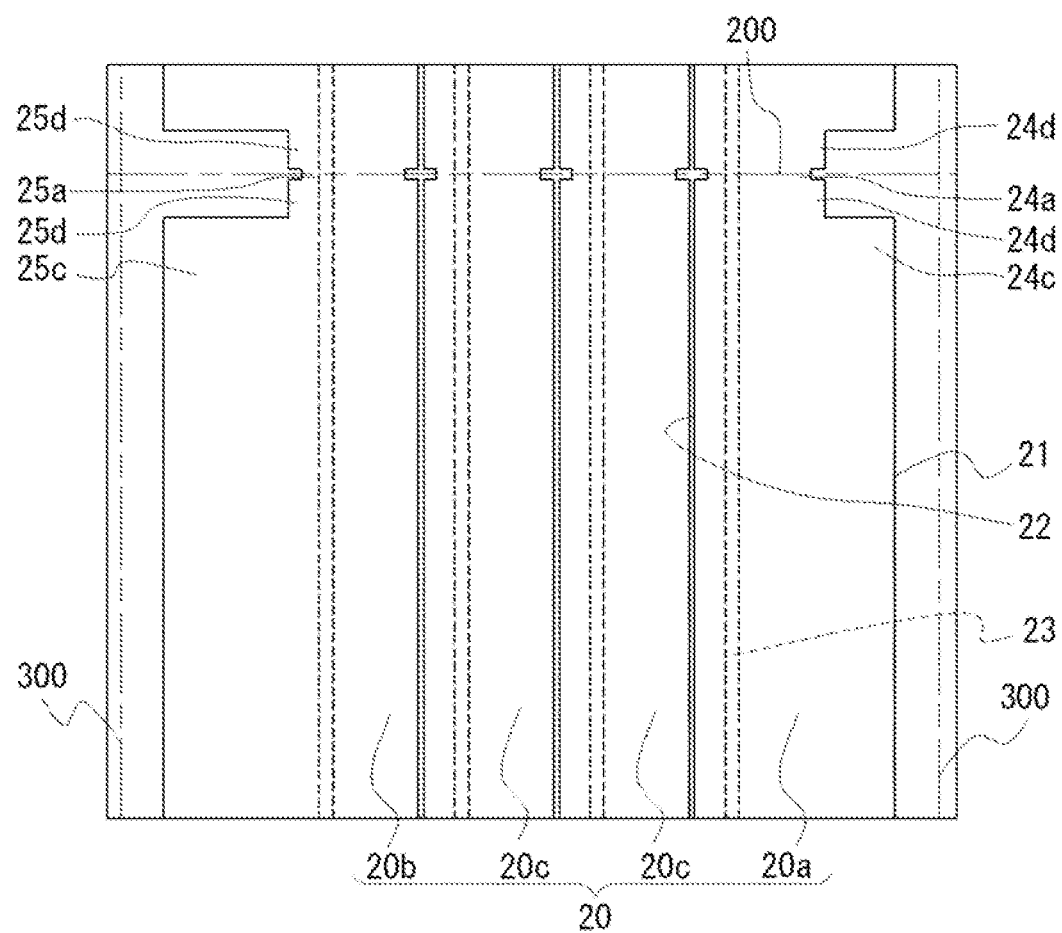
FIG. 6A is a schematic top view illustrating a modification of the shape of the protrusions.

FIG. 6A is a schematic top view illustrating a modification of the shape of the protrusions 20. As shown in FIG. 6A, the distance between the protrusions 20 on the planned cleavage line 200 may be greater than the shortest distance between the protrusions 20. In FIG. 6A, on the planned cleavage line 200, the first side surface 21 and the second side surface 22 are each provided with a concave shape that is recessed toward the ridge 23. Consequently, deviation between the position actually cleaved in the cleavage step and the planned cleavage line 200 can be reduced. This concave shape may also be provided only to either the first side surface 21 or the second side surface 22, and in order to more reliably reduce deviation between the actual cleavage position and the planned cleavage line 200, it is preferable to provide this shape to both. In FIG. 6A, the first distance D1 is the distance from the ridge 23 to the side of the concave shape closest to the ridge 23, and the second distance D2 is the distance from the ridge 23 to the side of the concave shape closest to the ridge 23.

The protrusions 20 shown in FIG. 6A can be said to have a structure having an intermediate portion between the outer portion and the inner portion. Regarding the width in the direction running along the planned cleavage line 200, the width of the middle portion is greater than the width of the outer portion and less than the width of the inner portion.

Figure 6B:
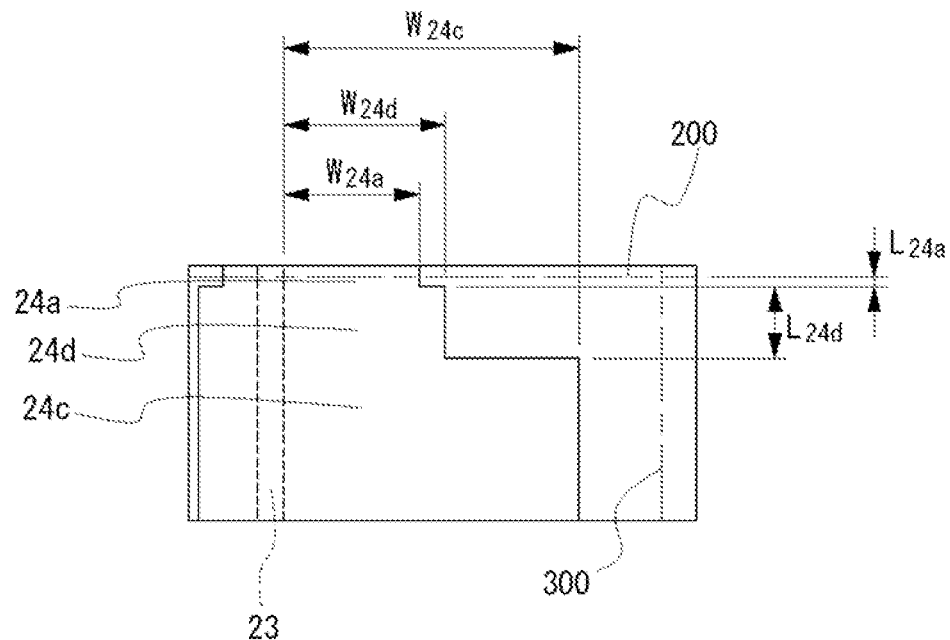
FIG. 6B is a partial enlarged view of FIG. 6A.

FIG. 6B is an enlarged view of a portion of the first protrusion 20a in the vicinity of the line of the planned cleavage line 200. As shown in FIG. 6B, the first protrusion 20a has an intermediate portion 24d between the first outer portion 24a and the first inner portion 24c. The width $W_{24a}$ of the first outer portion 24a coincides with the first distance D1. The relation between the width $W_{24a}$ of the first outer portion 24a, the width $W_{24c}$ of the first inner portion 24c, and the width $W_{24d}$ of the intermediate portion 24d is $W_{24a}<W_{24d}<W_{24c}$. The relation between these widths can satisfy $(W_{24d}-W_{24a})<(W_{24c}-W_{24d})$. As shown in FIG. 6A, providing the intermediate portion 24d allows the portion between the intermediate portion 24d of one element region 400 and the intermediate portion 24d of another element region 400 adjacent thereto, with the planned cleavage line 200 in between, to be used as a portion that guides the progress of cleavage. In order to use this portion as such a guide, the length in a direction running along the lengthwise direction of the ridge 23 is preferably such that the relation between the length $L_{24a}$ of the first outer portion 24a and the length $L_{24d}$ of the intermediate portion 24d is $L_{24a}<L_{24d}$. The length of the first inner portion 24c may be greater than the length $L_{24d}$ of the intermediate portion 24d.

Figure 6C:
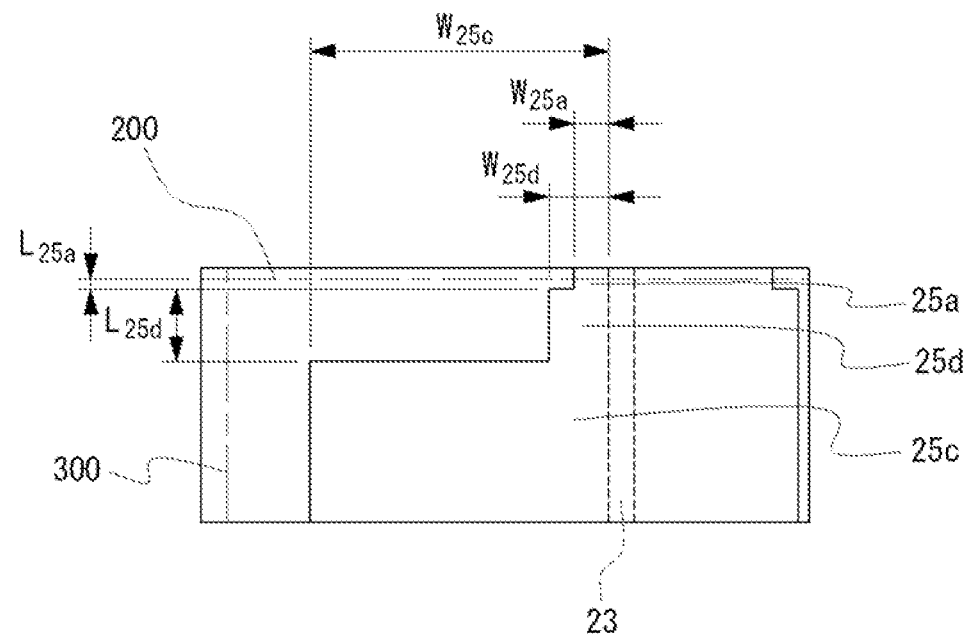
FIG. 6C is a partial enlarged view of FIG. 6A.

FIG. 6C is an enlarged view of a portion of the second protrusion 20b in the vicinity of the line of the planned cleavage line 200. The second protrusion 20b has an intermediate portion 25d between the third outer portion 25a and the second inner portion 25c. The width $W_{25a}$ of the third outer portion 25a coincides with the second distance D2. The relation between the width $W_{25a}$ of the third outer portion 25a, the width $W_{25c}$ of the second inner portion 25c, and the width $W_{25d}$ of the intermediate portion 25d is $W_{25a}<W_{25d}<W_{25c}$. The relation between these widths can satisfy $(W_{25d}-W_{25a})<(W_{25c}-W_{25d})$. As shown in FIG. 6A, providing the intermediate portion 25d allows the portion between the intermediate portion 25d of one element region 400 and the intermediate portion 25d of another element region 400 adjacent thereto, with the planned cleavage line 200 in between, to be used as a portion that guides the progress of cleavage. In order to use this portion as such a guide, the length in a direction running along the lengthwise direction of the ridge 23 is preferably such that the relation between the length $L_{25a}$ of the third outer portion 25a and the length $L_{25d}$ of the intermediate portion 25d is $L_{25a}<L_{25d}$. The length of the second inner portion 25c may be greater than the length $L_{25d}$ of the intermediate portion 25d.

As shown in FIG. 6A, the second region of the first protrusion 20a can have an outer portion and an inner portion having different widths in the direction running along the planned cleavage line 200. The second region of the first protrusion 20a does not have an intermediate portion, and the outer portion and the inner portion are directly connected together. The width of the outer portion of the second region of the first protrusion 20a coincides with the second distance D2. The difference between the width of the outer portion and the width of the inner portion in the second region of the first protrusion 20a may be the same as the difference between the width of the first outer portion 24a and the width of the intermediate portion 24d in the first region of the first protrusion 20a. Regarding the length of the ridge 23 in the lengthwise direction, the length of the outer portion of the second region of the first protrusion 20a can be the same as the length of the first outer portion 24a.

As shown in FIG. 6A, the first region of the second protrusion 20b can have an outer portion and an inner portion having different widths in the direction running along the planned cleavage line 200. The first region of the second protrusion 20b does not have an intermediate portion, and the outer portion and the inner portion are directly connected together. The width of the outer portion of the first region of the second protrusion 20b coincides with the first distance D1. The difference between the width of the outer portion and the width of the inner portion in the first region of the second protrusion 20b may be the same as the difference between the width of the third outer portion 25a and the width of the intermediate portion 25d in the second region of the second protrusion 20b. Regarding the length of the ridge 23 in the lengthwise direction, the length of the outer portion of the first region of the second protrusion 20b can be the same as the length of the third outer portion 25a.

As shown in FIG. 6A, the first region of the intermediate protrusion 20c can have an outer portion and an inner portion having different widths in the direction running along the planned cleavage line 200. The first region of the intermediate protrusion 20c does not have an intermediate portion, and the outer portion and the inner portion are directly connected together. The width of the outer portion of the first region of the intermediate protrusion 20c coincides with the first distance D1. The difference between the width of the outer portion and the width of the inner portion in the first region of the intermediate protrusion 20c may be the same as the difference between the width of the first outer portion 24a of the first protrusion 20a and the width of the intermediate portion 24d. Regarding the length along the lengthwise direction of the ridge 23, the length of the outer portion of the first region of the intermediate protrusion 20c can be the same as the length of the first outer portion 24a of the first protrusion 20a.

As shown in FIG. 6A, the second region of the intermediate protrusion 20c can have an outer portion and an inner portion having different widths in the direction running along the planned cleavage line 200. The second region of the intermediate protrusion 20c does not have an intermediate portion, and the outer portion and the inner portion are directly connected together. The width of the outer portion of the second region of the intermediate protrusion 20c coincides with the second distance D2. The difference between the width of the outer portion and the width of the inner portion in the second region of the intermediate protrusion 20c may be the same as the difference between the width of the third outer portion 25a and the width of the intermediate portion 25d of the second protrusion 20b. Regarding the length along the lengthwise direction of the ridge 23, the length of the outer portion of the second region of the intermediate protrusion 20c can be the same as the length of the third outer portion 25a of the second protrusion 20b.

As shown in FIG. 6A, the length of the outer portion may be the same in all the protrusions 20. In FIG. 6A, an intermediate portion is provided only in the first region of the first protrusion 20a and the second region of the second protrusion 20b, located between the planned division line 300 and the ridge 23, and the other regions are not provided with intermediate portions. Consequently, the width of the laser diode element thus obtained can be reduced.

Figure 7A:
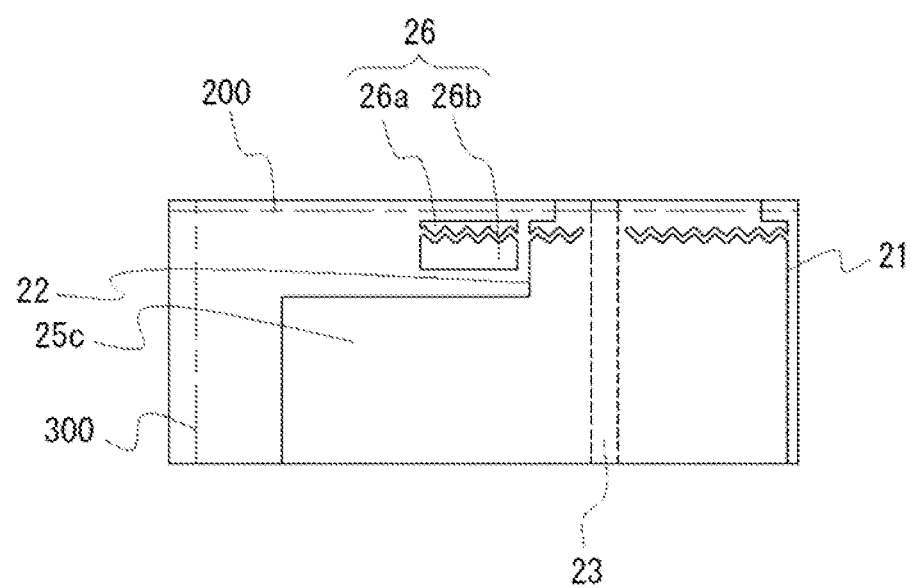
FIG. 7A is a schematic top view illustrating an example having island portions.

FIG. 7A is a schematic top view illustrating an example having island portions. FIG. 7A is an enlarged view of a portion of the second protrusion 20b in the vicinity of the line of the planned cleavage line 200. In FIG. 7A, the insulating film 30 and the like are omitted as in FIG. 6C. As shown in FIG. 7A, the element region 400 includes an island portion 26 that is separated from the second protrusion 20b, between the second inner portion 25c and at least one of the planned cleavage lines 200. The island portion 26 can be formed by removing part of the plurality of semiconductor layers on the nitride semiconductor substrate 11 by using photolithography and etching, for example.

Providing the island portion 26 allows the ripple produced in the far field pattern (FFP) of the resulting laser diode element to be reduced. The other protrusions 20 are disposed to the side of the second region of the first protrusion 20a and the intermediate protrusion 20c, and no protrusion is disposed to the side of the second region of the second protrusion 20b. In other words, the second region of the first protrusion 20a and the intermediate protrusion 20c is sandwiched between a ridge and another protrusion 20, and the second region of the second protrusion 20b is not in such a positional relation. Therefore, particularly in a structure in which the second distance D2 is less than the first distance D1, the amount of light that leaks from the second region of the second protrusion 20b when the obtained laser diode element is driven tends to be larger than the amount of light that leaks from the first region of the second protrusion 20b. Also, the amount of light that leaks from the second region of the second protrusion 20b tends to be larger than the amount of light that leaks from the first region and the second region of the first protrusion 20a and the intermediate protrusion 20c. These tendencies are more pronounced when the second inner portion 25c is provided. In view of this, by providing the island portion 26, the second distance D2 can be maintained while absorbing or scattering the light that leaks from the second region of the second protrusion 20b. Therefore, the ripple produced in the FFP of the obtained laser diode element can be reduced.

In order to reduce the ripple of FFP more efficiently, the island portion 26 is preferably provided near the planned cleavage line 200. The shortest distance between the island portions 26 and the planned cleavage line 200 can be 3 μm or less, for example. Also, the island portion 26 is provided so as to be located between the end face on the light emitting side and the second inner portion 25c in the obtained laser diode element. The island portion 26 may instead be provided so as to be located between the end face on the light reflecting side and the second inner portion 25c. One element region 400 may have an island portion 26 between one of the planned cleavage lines 200 and the second inner portion 25c, and one between another of the planned cleavage lines 200 and the second inner portion 25c. The island portion 26 may be provided to the second protrusion 20b that does not have the second inner portion 25c. In this case, the island portion 26 is disposed between the second protrusion 20b and the adjacent planned division line 300. The island portion 26 may be provided between the planned cleavage line 200 and the first inner portion 24c of the first protrusion 20a. In the case that the goal is to reduce ripple in the FFP of the laser beam emitted by the second protrusion 20b, the island portion 26 may not be provided between the first inner portion 24c of the first protrusion 20a and the planned cleavage line 200, and may be provided only between the second inner portion 25c of the second protrusion 20b and the planned cleavage line 200. Also, the island portion 26 need not be provided between the intermediate protrusion 20c and the planned cleavage line 200.

In the case that a groove formed by using a laser scribing device or the like reaches the island portion 26 in the cleavage step discussed below, there is the possibility of short-circuiting between the p-type semiconductor layer and the n-type semiconductor layer of the island portion 26. Therefore, the island portion 26 is preferably provided away from the second protrusion 20b. The lower end of the island portion 26 is located below the lower surface of the active layer 13. The shortest distance between the island portion 26 and the second inner portion 25c can be set to be greater than the shortest distance between the island portion 26 and the planned cleavage line 200.

Regarding the width in the direction running along the planned cleavage line 200, the width of the island portion 26 may be less than the width of the second inner portion 25c. For example, in the case that a line parallel to the planned cleavage line 200 is superimposed with the island portion 26 in top view, the width of the island portion 26 can be set so that the distance between the ridge 23 and the farthest end of the island portion 26 from the ridge 23 on this line is equal to the distance between the ridge 23 and the first side surface 21 of the first protrusion 20a. This is expected to reduce the difference in the FFP between the laser light emitted from the first protrusion 20a and the laser light emitted from the second protrusion 20b in the resulting laser diode element.

It should be noted that saying that the distances are equal encompasses a case in which the difference between the distances is 1 μm or less. The width of the island portion 26 can be 95% or less of the width of the second inner portion 25c, and furthermore can be 40% or less. The width of the island portion 26 can be 20% or more of the width of the second inner portion 25c, and furthermore can be 30% or more.

There may be just one island portion 26, but as shown in FIG. 7A, the island portion 26 may include a first portion 26a and a second portion 26b. In top view, the second portion 26b is separated from the first portion 26a and is located between the first portion 26a and the second inner portion 25c. Since the island portion 26 is thus composed of a plurality of portions, there is a higher probability that light will be reflected due to the difference in refractive index between each portion and the outside thereof (for example, the insulating film 30, air or the like), so the ripples in the FFP can be effectively reduced. Of the side surface of the first portion 26a and the side surface of the second portion 26b, at least the portions opposite each other are preferably located below the lower surface of the active layer 13. This further reduces ripples in the FFP. The shortest distance between the first portion 26a and the second portion 26b is 2 μm or less, for example. The shortest distance between the first portion 26a and the second portion 26b is 0.5 μm or more, for example.

In FIG. 7A, the first portion 26a and the second portion 26b are separated by a wavy groove, and the bottom of the groove is located below the lower surface of the active layer 13. The wavy groove can be said to have a first constituent side and a second constituent side having different inclination angles with respect to the resonance surface in top view. Providing the first constituent side and the second constituent side allows leaked light to be refracted in two different directions. Therefore, the concentration of refracted light leakage in a specific direction can be moderated. The top view shape of the groove can also be described as the portion where the outer edge of the first portion 26a and the outer edge of the second portion 26b are facing each other. The groove separating the first portion 26a and the second portion 26b does not have to be wavy.

In FIG. 7A, part of the first side surface 21 and the second side surface 22 of the second protrusion 20b has a shape extending toward the ridge 23. Thus providing a concave portion that is recessed downward near the ridge 23 on the light emitting side further reduces the ripples that are produced in the FFP of the resulting laser diode element. In the case where a groove is thus provided to the second protrusion 20b, the groove that separates the first portion 26a and the second portion 26b may be disposed on an extension line of the groove. In FIG. 7A, the groove provided to the second protrusion 20b has a wavy shape in top view.

Figure 7B:
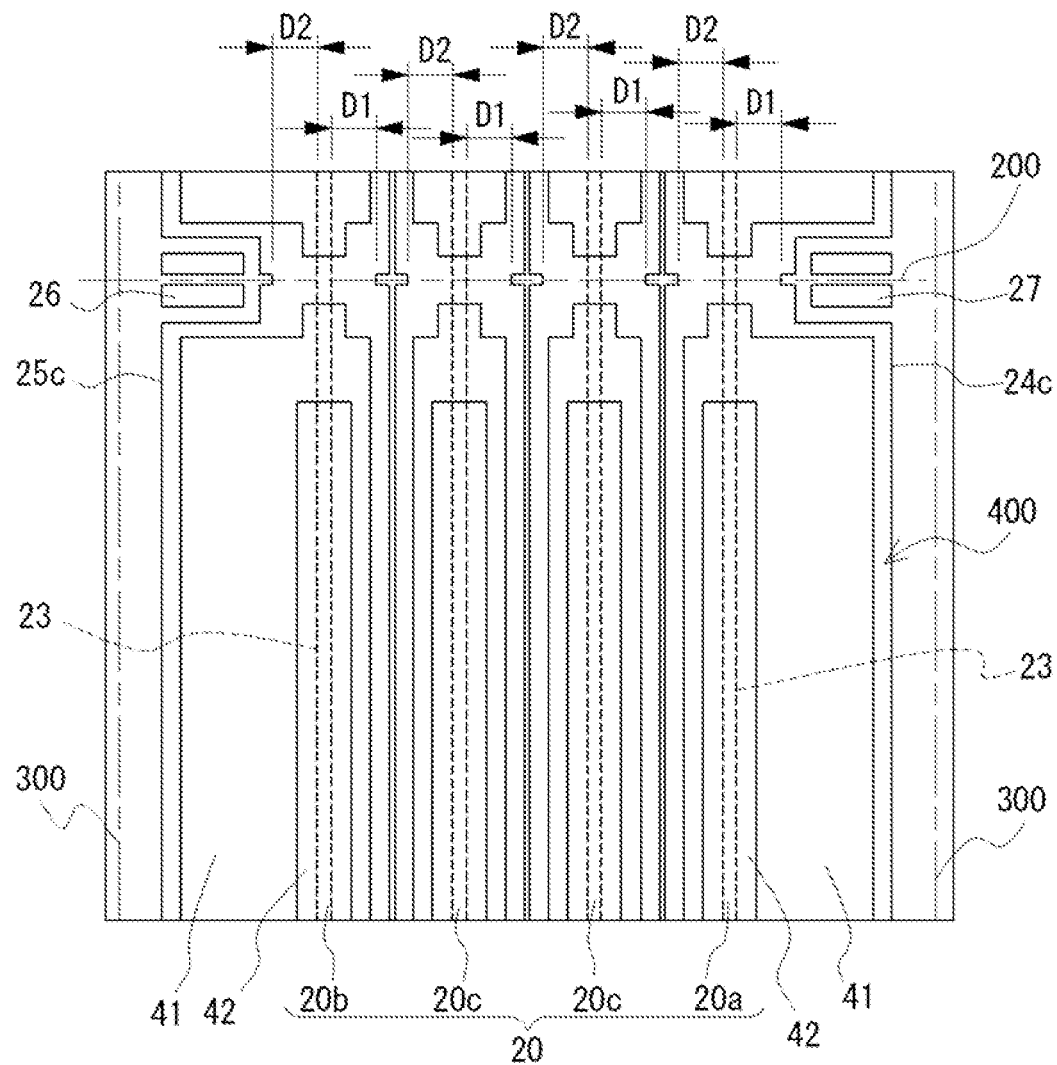
FIG. 7B is a schematic top view illustrating another example having island portions.

FIG. 7B is a schematic top view illustrating another example having island portions 26. In FIG. 7B, a third distance between the ridge 23 and the end of the island portion 26 that is farthest from the ridge 23 of the second protrusion 20b is equal to a fourth distance between the ridge 23 and the end of the second inner portion 25c that is farthest from the ridge 23 of the protrusion 20b. Equal of the third distance and the fourth distance encompasses a case in which the difference between these widths is 1 μm or less. The third distance may be greater than the fourth distance. Making the third distance be equal to or greater than the fourth distance further reduces the ripples in the FFP of the laser light emitted from the second protrusion 20b in the resulting laser diode element. In the case where the resulting laser diode element is mounted in a package and sealed, the incidence of ripples in the FFP of the laser beam emitted by the laser diode element may increase after sealing as compared with that before mounting. If this happens, the incidence of ripples in the FFP of the laser beam emitted by the second protrusion 20b after the package is sealed can be reduced more reliably by making the third distance equal to or greater than the fourth distance.

As shown in FIG. 7B, the element regions 400 can have an island portion 27 separated that is from the first protrusion 20a, between the first inner portion 24c and at least one of the planned cleavage lines 200. Providing the island portion 27 reduces the ripples produced in the FFP of the obtained laser diode element. The island portion 27 can be formed, for example, by removing some of the plurality of semiconductor layers on the nitride semiconductor substrate 11 by photolithography and etching. In FIG. 7B, in top view, a fifth distance between the ridge 23 and the end of the island portion 27 that is farthest from the ridge 23 of the first protrusion 20a is equal to a sixth distance between the ridge 23 and the end of the first inner portion 24c that is farthest from the ridge 23 of the protrusion 20a. Equal of the fifth distance and the sixth distance encompasses a case in which the difference between these widths is 1 μm or less. The fifth distance may be greater than the sixth distance. Making the fifth distance equal to or larger than the sixth distance more reliably reduces the incidence of ripples in the FFP of the laser beam emitted from the first protrusion 20a after the package is sealed.

In FIG. 7B, the third distance between the ridge 23 and the end of the island portion 26 that is farthest from the ridge 23 of the second protrusion 20b is equal to the fifth distance between the ridge 23 and the end of the island portion 27 that is farthest from the ridge 23 of the first protrusion 20a. This is expected to reduce the difference in the FFP between the laser light emitted from the first protrusion 20a and the laser light emitted from the second protrusion 20b in the resulting laser diode element. Equal of the third distance and the fifth distance encompasses a case in which the difference between the distances is 1 μm or less.

In FIG. 7B, the first distance D1 from the first side surface 21 to the ridge 23 is equal to the second distance D2 from the second side surface 22 to the ridge 23, on the planned cleavage lines 200. Equal of the first distance D1 and the second distance D2 encompasses a case in which the difference between the distances is 1 μm or less. In the case where the first distance D1 and the second distance D2 are equal, it is preferable to provide both the island portion 26 and the island portion 27. Consequently, the difference in the FFP between the laser light emitted from the first protrusion 20a and the laser emitted from the second protrusion 20b in the obtained laser diode element can be reduced as compared to a case in which only one of the island portion 26 and the island portion 27 is provided. The shape of the island portion 26 and the island portion 27 may be a shape having a first portion and a second portion as shown in FIG. 7A.

In top view, the protrusions 20 each have a first region located on the first side surface 21 side and a second region located on the second side surface 22 side, with the ridge 23 as a boundary between them. As shown in FIGS. 4A and 4C, the element regions 400 include a plurality of first conductive layers 41 disposed above the first region and the respective ridges 23 of the plurality of protrusions 20. The first conductive layer 41 is electrically connected to the second conductivity type semiconductor layer 14. The first conductive layers 41 may also be formed in the second region. In the case where the protrusions 20 have an outer portion and an inner portion as discussed above, the first conductive layers 41 can be provided mainly on the inner portion.

The first conductive layers 41 can be formed, for example, by stacking one or more layers of Ni, Rh, Cr, Au, W, Pt, Ti, Al, Pd or another such metal or alloy. The first conductive layers 41 are formed, for example, by stacking a Ni layer, a Pd layer, a Au layer, a Pt layer, a Au layer, a Pt layer in that order. As shown in FIGS. 4A and 4C, in the case where the second conductive layer 42 is provided on the first conductive layers 41, it is preferable for the outermost surface of the first conductive layer 41 not to contain gold. Consequently, in the case where a joining material containing gold, such as AuSn or the like, is used as a conductive joining material for electrically connecting the laser diode element to the conductive layer of a submount and the like, the joining material will be less likely to adhere to the outermost surface of the first conductive layer 41. Therefore, protrusions 20 that are adjacent via a first conductive layer 41 are less likely to short-circuit. The outermost surface of the first conductive layer 41 is preferably made of a material that functions as a barrier layer with respect to the metal joining material for joining the laser diode element, such as a platinum layer.

In top view, the shapes of the first conductive layers 41 of the plurality of protrusions 20 do not all have to be the same. In this embodiment, the element regions 400 are all disposed in the same orientation. That is, in FIG. 4A, the lower side in the drawing is the light emitting side and the upper side in the drawing is the light reflecting side, with a planned cleavage line 200 as the boundary in between them. In FIG. 4A, the first protrusion 20a and the second protrusion 20b are such that the shape of the first conductive layers 41 on the light emitting side portion and the light reflecting side portion is in line symmetry with respect to the planned cleavage lines 200. On the other hand, in the intermediate protrusion 20c, the shape of the first conductive layers 41 on the light emitting side portion and the light reflecting side portion is not in line symmetry with respect to the planned cleavage lines 200. Thus, in one or more of the protrusions 20, the shape of the first conductive layers 41 on the light emitting side portion and the light reflecting side portion may be asymmetrical with respect to the planned cleavage lines 200. This makes it easier to determine which is the light emitting side portion and which is the light reflecting side portion. Also, the top view shape of the first conductive layers 41 is preferably asymmetric in 180-degree rotation around the center of the element regions 400. This makes it easier to determine which is the light emitting side surface and which is the light reflecting side surface in the obtained laser diode element.

As shown in FIG. 4C, upper electrodes 50 may be provided between the first conductive layers 41 and the second conductivity type semiconductor layer 14. In FIG. 4C, ridges 23 are formed on a part of the upper surface of the second conductivity type semiconductor layer 14, and the upper electrodes 50 are formed in contact with the upper surfaces of the ridges 23. The upper electrodes 50 are p electrodes, for example. Examples of the upper electrodes 50 include a single-layer film or a multilayer film of Ni, Rh, Cr, Au, W, Pt, Ti, Al or other such metal or alloy, or a conductive oxide and the like containing at least metal selected from among zinc, indium, and tin. Examples of conductive oxides include ITO (indium tin oxide). As shown in FIGS. 4A and 4B, the upper electrodes 50 can be formed, for example, so as to avoid the planned cleavage lines 200.

The element regions 400 can include a plurality of second conductive layers 42 disposed above the respective first conductive layers 41. The second conductive layer 42 is electrically connected to the first conductive layer 41. As shown in FIG. 4A, the width of the second conductive layer 42 is preferably less than the width of the first conductive layer 41, the width in the direction running along the planned cleavage lines 200. Consequently, the shortest distance between the second conductive layers 42 of adjacent protrusions 20 can be made greater than the shortest distance between the first conductive layers 41 of adjacent protrusions 20, making it less likely that adjacent protrusions 20 will short-circuit. In particular, such an arrangement is preferable in the case of performing flip-chip bonding, in which the second conductive layers 42 are mounted on a submount and the like.

In FIGS. 3 and 4A, the outer edges of the second conductive layers 42 are located inside the outer edges of the first conductive layers 41 in top view. Also, the outer edges of the second conductive layers 42 are located to the inside of the outer edges of the first region in top view. Thus, it is preferable for the second conductive layer 42 to be disposed so as to avoid the upper parts of the ridges 23. If the second conductive layers 42 are formed on a step such as a ridge 23, the film thickness may be uneven or partial separation may occur, but this will be less likely to happen if the second conductive layers 42 are formed on a relatively flat surface that does not include any ridges 23.

The second conductive layers 42 can be formed, for example, by stacking one or more layers of Ni, Rh, Cr, Au, W, Pt, Ti, Al or another such metal or alloy. The second conductive layers 42 are formed, for example, by stacking a Ti layer, a Pt layer, a Au layer in that order. It is preferable for the outermost surface of the second conductive layers 42 to be a gold layer or another such layer containing gold, so as to facilitate joining to a conductive bonding material such as AuSn or the like.

In FIG. 4A, the first conductive layer 41 disposed above the second protrusion 20b is also disposed above the second region of the second protrusion 20b. The element regions 400 can include a third conductive layer 43 disposed above the second region of the second protrusion 20b. The third conductive layers 43 can be formed, for example, by stacking one or more layers of Ni, Rh, Cr, Au, W, Pt, Ti, Al or another such metal or alloy. The third conductive layers 43 are formed, for example, by stacking a Ti layer, a Pt layer, a Au layer in that order. The third conductive layer 43 may be formed together with the second conductive layer 42, from the same material and in the same film thickness as the second conductive layer 42. As shown in FIGS. 4A and 4B, the first conductive layers 41, the second conductive layers 42, and the third conductive layer 43 can be formed so as to avoid the planned cleavage lines 200.

In FIGS. 3 and 4A, the outer edge of the third conductive layer 43 is located to the inside of the outer edges of the first conductive layers 41 in top view. Also, the outer edge of the third conductive layer 43 is located to the inside of the outer edge of the second region of the second protrusion 20b in top view. Thus, it is preferable for the third conductive layer 43 to be disposed so as to avoid the upper parts of the ridges 23. If the third conductive layer 43 is formed on a step such as a ridge 23, the film thickness may be uneven or partial separation may occur, but this will be less likely to happen if the third conductive layer 43 is formed on a relatively flat surface that does not include any ridges 23. Providing the third conductive layer 43 allows the heat generated when the obtained laser diode element is driven to be dissipated to a support or the like discussed below via the third conductive layer 43, so the heat dissipation is improved.

The maximum width of the first protrusion 20a in the direction running along the planned cleavage lines 200 can be made greater than the maximum width of the intermediate protrusion 20c in the direction running along the planned cleavage lines 200. Consequently, regarding the width of the external connection portion, such as the second conductive layer 42, in the direction running along the planned cleavage lines 200, the width of the external connection portion in the first protrusion 20a can be made greater than the width of the external connection portion in the intermediate protrusion 20c. This makes it easier to bring an inspection instrument such as an inspection needle and the like of a probe device used for inspection prior to mounting into contact with the external connection portion of the first protrusion 20a. For the same reason as with the first protrusion 20a, the maximum width of the second protrusion 20b in the direction running along the planned cleavage lines 200 can be set greater than the maximum width of the intermediate protrusion 20c in the direction running along the planned cleavage lines 200. For example, regarding the width in the direction running along the planned cleavage lines 200, the width of the second conductive layer 42 and the width of the third conductive layer 43 of the first protrusion 20a are greater than the width of the second conductive layer 42 of the intermediate protrusion 20c and the width of the second conductive layer 42 of the second protrusion 20b.

Figure 8:
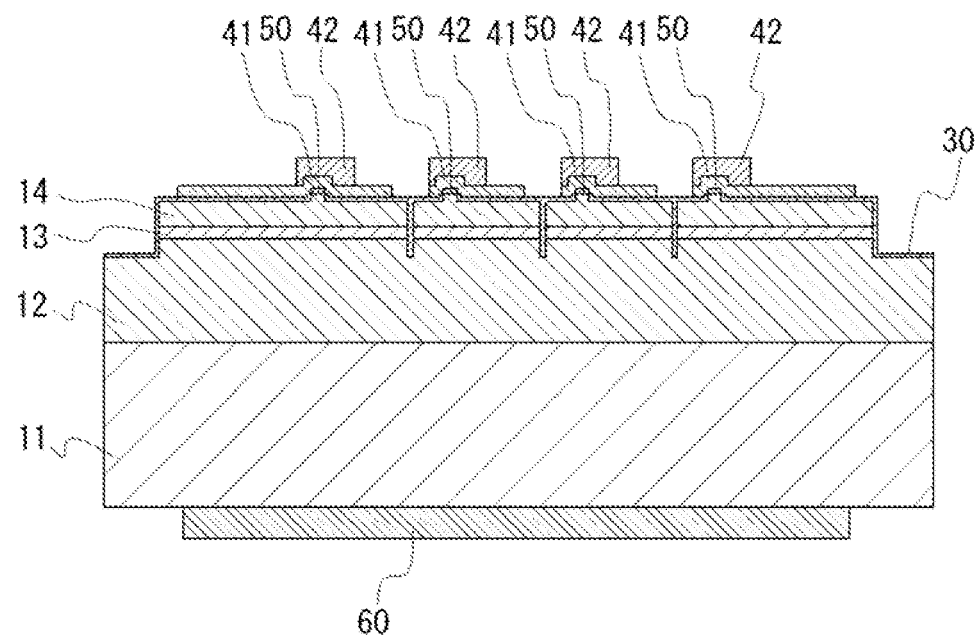
FIG. 8 is a schematic cross-sectional view illustrating a modification example of the stacked body.

FIG. 8 is a schematic cross-sectional view illustrating a modification example of the stacked body. As shown in FIG. 8, the second conductive layer 42 may be disposed above the ridge 23. In this case, the third conductive layer 43 need not be provided. Such an arrangement may be advantageous in order to reduce the width of the obtained laser diode element that is obtained. As shown in FIG. 8, one end of the second conductive layer 42 disposed on the intermediate protrusion 20c may be aligned with one end of the first conductive layer 41. Aligning the end of the first conductive layer 41 and the end of the second conductive layer 42 located between the ridge 23 and the second side surface 22 increases the surface area of the second conductive layer 42 as compared with the case where these are not aligned. Consequently, when the heat generated by driving the resulting laser diode element is dissipated to the support or the like discussed below via the second conductive layer 42, this dissipation will be more efficient.

As shown in FIG. 7B, in the case where the second conductive layer 42 is disposed above the ridge 23, the width in top view of the second conductive layer 42 provided on each of the plurality of protrusions 20 along the planned cleavage lines 200 can all be set to be equal. In top view, the lengths of the second conductive layers 42 provided to the plurality of protrusions 20 along the planned division lines 300 can all be set to be equal. Saying that the widths or lengths of the plurality of second conductive layers 42 are equal encompasses not only a case where they are exactly the same, but also that the difference between the maximum value and the minimum value of the plurality of widths or lengths is 1 µm or less. As shown in FIG. 7B, in the case where the second conductive layer 42 is disposed above the ridge 23, the second distance D2 may be equal to the first distance D1. Saying that "the second distance D2 is equal to the first distance D1" encompasses not only a case where they are exactly the same, but also that the difference between the first distance D1 and the second distance D2 is 1 µm or less. Here again, the plurality of first distances D1 in one element region 400 are all equal. Consequently, it is possible to reduce variance in the characteristics of the plurality of laser beams corresponding to the plurality of ridges of the resulting laser diode element. Also, it is possible to reduce variance among a plurality of laser diode elements.

Figure 9A:
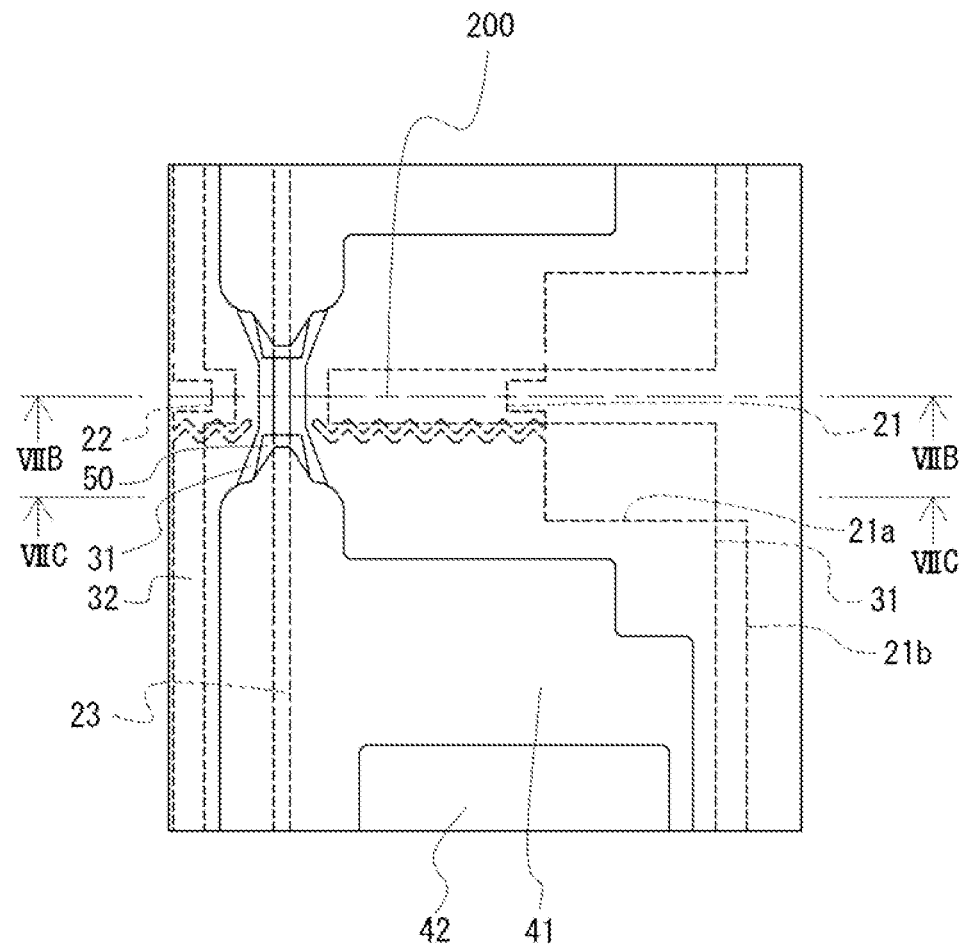
FIG. 9A is a schematic top view illustrating a modification example of the stacked body.
Figure 9B:
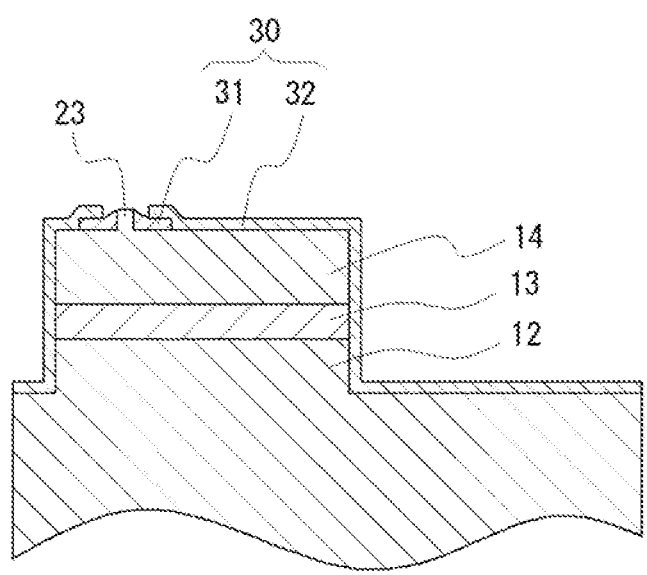
FIG. 9B is a cross-sectional view along the line VIIB-VIIB of FIG. 9A.
Figure 9C:
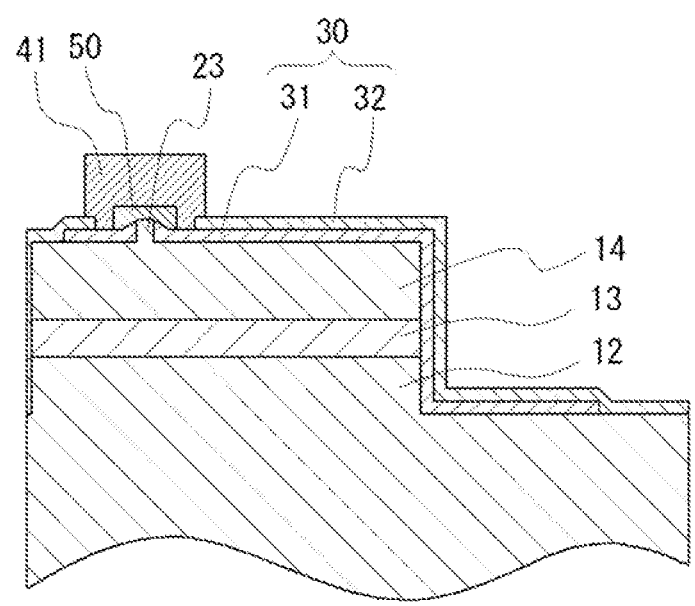
FIG. 9C is a cross-sectional view along the line VIIC-VIIC of FIG. 9A.

FIG. 9A is a schematic top view illustrating a modification example of the stacked body. FIG. 9B is a cross-sectional view along the line VIIB-VIIB of FIG. 9A. FIG. 9C is a cross-sectional view along the line VIIC-VIIC of FIG. 9A. FIG. 9A is a detail view of a portion of an element region 400 on the light emitting side of the first protrusion 20a, and the vicinity thereof. The modification examples shown in FIGS. 9A to 9C may be employed for a portion other than what is shown in FIG. 9A, that is, a protrusion 20 other than the first protrusion 20a or a portion on the light reflecting side.

The shape of the first protrusion 20a shown in FIG. 9A is substantially the same as the shape of the first protrusion 20a shown in FIG. 6A, but a difference is that a part of the first side surface 21 and the second side surface 22 in the vicinity of the planned cleavage lines 200 has a wavy shape that faces toward the ridge 23. Thus providing a concave component that is recessed downward in the vicinity of the ridge 23 on the light emitting side reduce ripples produced in the far field pattern (FFP) of the laser diode element thus obtained.

In FIG. 9A to FIG. 9C, a first insulating film 31 and a second insulating film 32 are provided as the insulating film 30. Thus, the insulating film 30 may have two or more layers made of different materials and/or formed at different positions. The first insulating film 31 is provided in contact with the ridge 23. In top view, the width of the planned cleavage line 200 is such that the width of the first insulating film 31 is less than the width of the first protrusion 20a.

As shown in FIG. 9A and FIG. 9C, the first insulating film 31 may be formed not only on the upper surfaces of the protrusions 20, but also on the surface of the first conductivity type semiconductor layer 12 that is contiguous with the side surfaces of the protrusion 20s. Since the outer edge of the first insulating film 31 is not located between the first conductive layer 41 and the first side surface 21, the distance between the first conductive layer 41 and the first side surface 21 can be made less than otherwise. In FIG. 9A, the first region of the protrusions 20 has an inner portion in which the main portion of the first conductive layer 41 is disposed, and a narrow portion where the width is narrower than at the inner portion. The outer edge of this inner portion has a first side 21a that is connected to the narrow portion and extends away from the ridge 23, and a second side 21b that is connected to the first side and extends along a direction intersecting the planned cleavage lines 200. Disposing the outer edge of the first insulating film 31 between the second side 21b and the first conductive layer 41 suppresses an increase in the width of the protrusions 20. Also, disposing a part of the outer edge of the first insulating film 31 outside the protrusions 20 so that the outer edge of the first insulating film 31 is not located between the first side 21a and the first conductive layer 41 allows for a shorter distance between the first side 21a and the first conductive layer 41. This allows the surface area of the first conductive layer 41 to be increased.

The second insulating film 32 is formed at a position separated from the ridge 23. That is, the second insulating film 32 is not in contact with the ridge 23. The second insulating film 32 can cover the surface of the first insulating film 31 and the surface of the second conductivity type semiconductor layer 14 and other such semiconductor layers that are exposed from the first insulating film 31. In the case where the upper surface side of the stacked body 100 is flip-chip mounted on a submount or the like, it is preferable to cover everything but the upper surface of the ridge 23 with the insulating film 30 in top view. This makes less likely that the protrusions 20 will short-circuit. The insulating film 30 can be formed of a single-layer film or a multilayer film of an oxide, nitride, or the like of Si, Al, Zr, Ti, Nb, Ta, or the like, for example. For example, the refractive index of the first insulating film 31 is higher than the refractive index of the second insulating film 32.

As shown in FIG. 4C, the stacked body 100 can have one or more lower electrodes 60 disposed on its lower surface side. In FIG. 4C, the lower electrode 60 is formed on the lower surface of the nitride semiconductor substrate 11. The lower electrode 60 is an n electrode, for example. There may be just one lower electrode 60 in a single element region 400. If there is only one lower electrode 60, that is advantageous in terms of making the laser diode element more compact. The lower electrode 60 can be formed, for example, by stacking one or more layers of Ni, Rh, Cr, Au, W, Pt, Ti, Al or another such metal or alloy.

Cleavage Step S102

Figure 10:
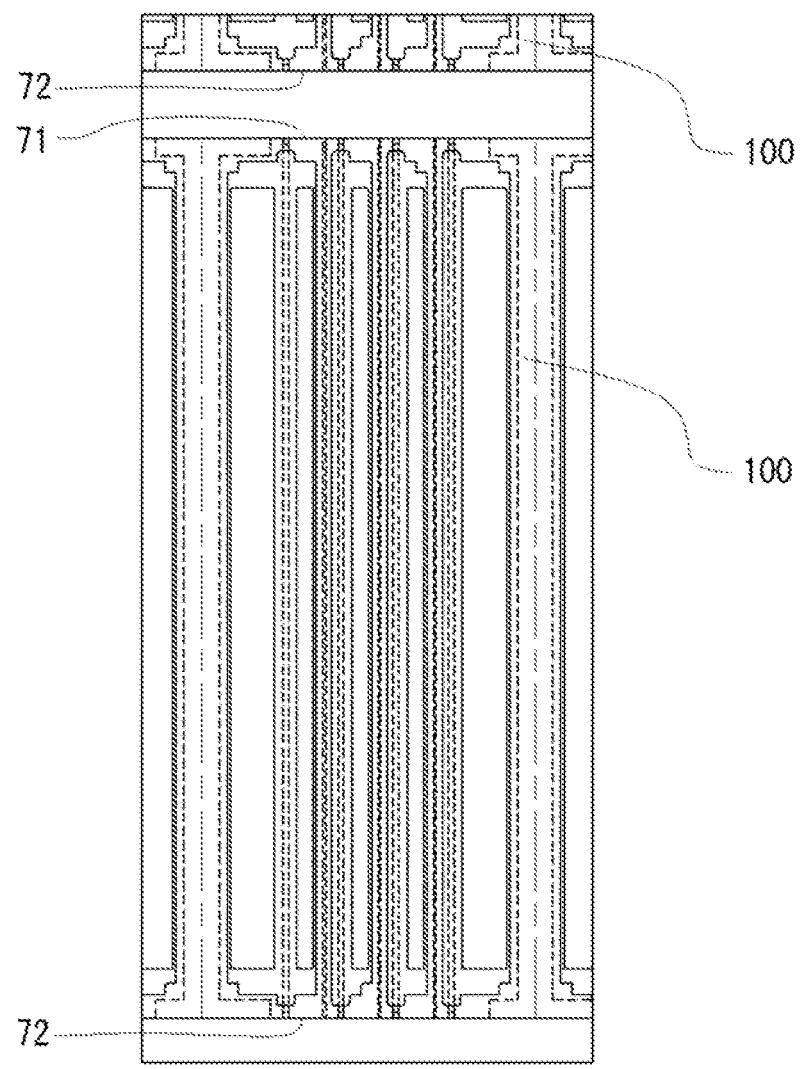
FIG. 10 is a schematic top view showing the method for manufacturing a laser diode element according to an embodiment of the present invention.

Next, as shown in FIG. 10, the stacked body 100 is cleaved along the planned cleavage lines 200. Cleavage at each of the plurality of protrusions 20 starts from the first side surface 21 and reaches the second side surface 22. That is, in FIG. 10, cleavage proceeds from right to left. Cleavage can be performed, for example, by first using a laser scribe device to form a groove on a part of the planned cleavage lines 200, and then pushing on the stacked body 100 with a blade. The groove formed by the laser scribe device may be formed at a position overlapping the planned cleavage line 200, and between the first side surface 21 of one element region 400 and the second side surface 22 of the other element region 400 on the opposite side.

The grooves formed by the laser scribe device may be formed only outside the element regions 400. For instance, grooves extending along the planned cleavage lines 200 may be formed at one end of a wafer or the stacked body 100 obtained by dividing a wafer into pieces, and the stacked body 100 can be cleaved along the grooves by an external force. In this case, cleavage starts from the position where the groove was made. Therefore, the groove is provided at the end portion closer to the first protrusion 20a than to the second protrusion 20b. Grooves may be formed at both of the two opposing ends of the stacked body 100. In this case, the position where cleavage starts can be adjusted by varying the position where the external force is applied. The grooves used for cleavage, which are formed with a laser scribe device or the like, can be formed in the surface of the stacked body 100 on the side where the ridges 23 are located, for example. The length of a groove along the planned cleavage line 200 can be about 1 to 10 mm. The length of a groove may be, for example, between 1 and 3 times the width of one element region 400. The depth of a groove can be 10 to 100 μm, for example. The position to be cleaved coincides with the planned cleavage line 200 in top view, for example. Since the cleavage does not always happen at the intended position, the cleavage position does not have to coincide perfectly with the planned cleavage line 200. In FIG. 10, the direction in which the cleavage proceeds is from right to left in the drawing, but the opposite is also possible, in which case the left side of the ridge 23 in the drawing will be the first side surface, and the right side of the ridge 23 in the drawing will be the second side surface.

Performing the cleavage step forms an end face on the light emitting side 71 end face on the light emitting side 71 and an end face on the light reflecting side 72. In FIG. 10, one of the two surfaces obtained as a result of cleavage along one of the planned cleavage lines 200 is the end face on the light emitting side 71, and the other is the end face on the light reflecting side 72. After the cleavage step, a light reflecting film may be formed on the end face on the light emitting side 71 and on the end face on the light reflecting side 72.

Dividing Step S103

Figure 11:
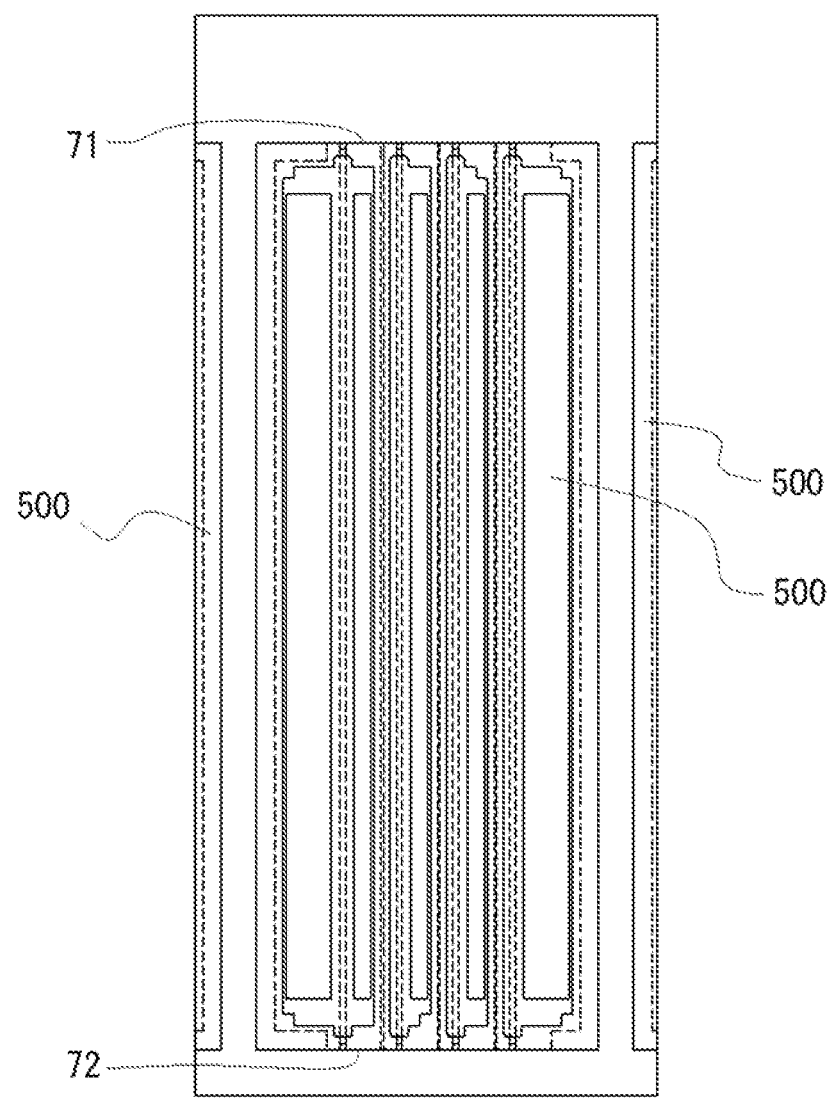
FIG. 11 is a schematic top view showing the method for manufacturing a laser diode element according to an embodiment of the present invention.

Next, as shown in FIG. 11, the stacked body 100 is divided along the planned division lines 300. This allows laser diode elements 500 to be obtained. The division can be performed, for example, by first forming grooves at positions overlapping the planned division lines 300 using a laser scribe device, and then pushing on the stacked body 100 with a blade. The division grooves formed by the laser scribe device are formed, for example, on the surface of the stacked body 100 on the side where the ridges 23 are located. In the case where the element regions 400 have island portions 26, when the dividing grooves reach the island portions 26, the p-type semiconductor layer and the n-type semiconductor layer of the island portions 26 may be short-circuited. Since the p-type semiconductor layer and the active layer of the second protrusion 20b are not connected to the p-type semiconductor layer and the active layer of the island portion 26, it is less likely that the division grooves will cause short-circuiting between the p-type semiconductor layer and the n-type semiconductor of the second protrusion 20b. Similarly, with the island portion 27, since the p-type semiconductor layer and the active layer of the island portion 27 are not connected to the p-type semiconductor layer and the active layer of the first protrusion 20a, it is less likely that the division grooves will cause short-circuiting between the p-type semiconductor layer and the n-type semiconductor layer of the first protrusion 20a. The Dividing step separates the plurality of element regions 400 into individual pieces. The order of the Dividing step and the cleavage step can be switched around. In the case where a light reflecting film is to be formed, it is preferable to use the order of this embodiment, in which the cleavage step is followed by the Dividing step, because the work efficiency can be improved.

The above steps produce a laser diode element in which variance in the characteristics of a plurality of laser beams corresponding to the plurality of ridges is reduced.

Laser Diode Element 500

Figure 12A:
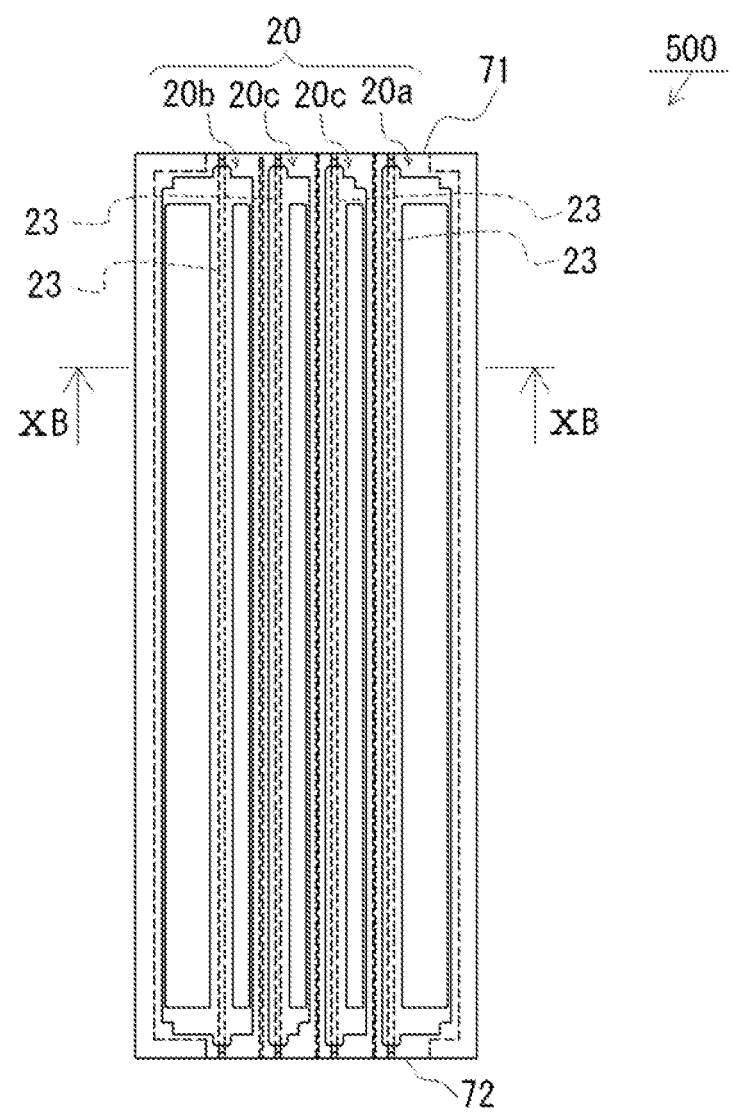
FIG. 12A is a schematic top view showing the laser diode element according to an embodiment of the present invention.
Figure 12B:
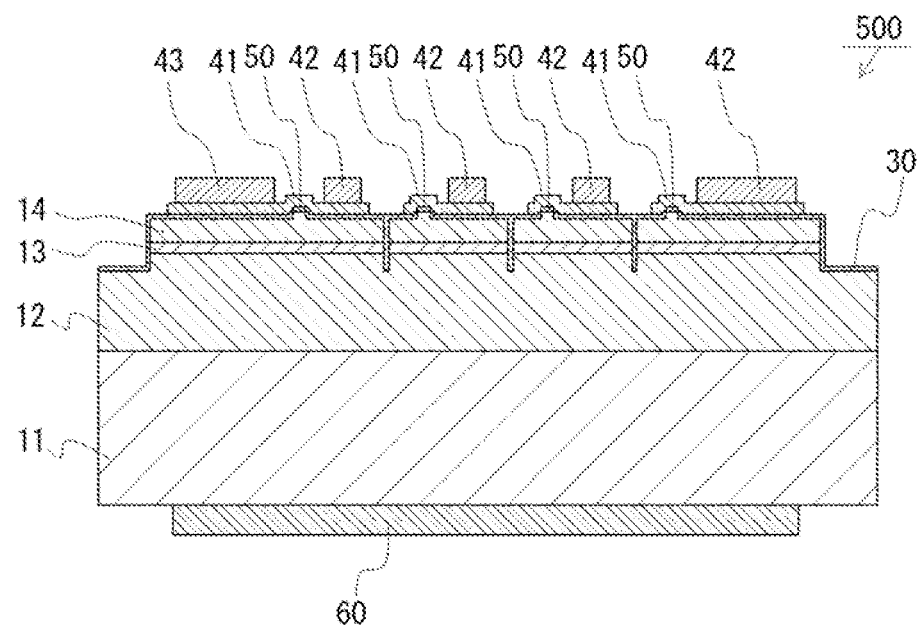
FIG. 12B is a cross-sectional view along the line XB-XB of FIG. 12A.

The laser diode element 500 according to this embodiment is shown in FIG. 12A and FIG. 12B. FIG. 12A is a schematic top view showing the laser diode element according to an embodiment of the present invention. FIG. 12B is a cross-sectional view along the line XB-XB of FIG. 12A. The laser diode element 500 has the nitride semiconductor substrate 11, the first conductivity type semiconductor layer 12, the active layer 13, the second conductivity type semiconductor layer 14, the end face on the light emitting side 71, the end face on the light reflecting side 72, and the plurality of protrusions 20. The first conductivity type semiconductor layer 12 is provided on the nitride semiconductor substrate 11, the active layer 13 is provided on the first conductivity type semiconductor layer 12, and the second conductivity type semiconductor layer 14 is provided on the active layer 13. The protrusions 20 each have a first side surface 21 and a second side surface 22 that connect the end face on the light emitting side 71 and the end face on the light reflecting side 72 to the ridges 23, respectively. The ridges 23 are disposed between the first side surface 21 and the second side surface 22 in top view, and the direction intersecting the end face on the light emitting side 71 is the lengthwise direction. The lower end of the first side surface 21 and the lower end of the second side surface 22 are located below the lower surface of the active layer 13. In top view, the first distance D1 from the first side surface 21 to the ridge 23 at the end face on the light emitting side 71 is different from the second distance D2 from the second side surface 22 to the ridge 23. The first distance D1 is the same for all of the protrusions 20. The first distance D1 and the second distance D2 may use the end face on the light reflecting side 72 as their reference. In top view, the first protrusion 20a has a first region located on the side of the first side surface 21 side and a second region located on the second side surface 22 side, with the ridge 23 as a boundary between them. The first region of the first protrusion 20a has a first outer portion including the end face on the light emitting side 71, a second outer portion including the end face on the light reflecting side 72, and a first inner portion located between the first outer portion and the second outer portion. Regarding the width in the direction running along the end face on the light emitting side 71, the width of the first inner portion is greater than the width of the first outer portion and the width of the second outer portion. In top view, the second protrusion 20b has a first region located on the first side surface 21 side and a second region located on the second side surface 22 side, with the ridge 23 as a boundary between them. The second region of the second protrusion 20b has a third outer portion including the end face on the light emitting side 71, a fourth outer portion including the end face on the light reflecting side 72, and a second inner portion located between the third outer portion and the fourth outer portion. Regarding the width in the direction running along the end face on the light emitting side 71, the width of the second inner portion is greater than the width of the third outer portion and the width of the fourth outer portion. In top view, an island portion is provided between the second inner portion and the end face on the light emitting side 71, and is separated from the second protrusion 20b.

The laser diode element 500 can independently control the drive of each of the plurality of protrusions 20. The number of ridges had by the laser diode element 500 is 2 or more, but may be 3 or more, or may be 4 or more. The width of the laser diode element 500 in the direction running along the end face on the light emitting side 71 can be 600 µm or less, for example. This width can be 100 µm or more, for example. The length of the laser diode element 500 in the direction along the lengthwise direction of the ridges 23 can be 300 µm or more, and can be 2 mm or less, for example. In top view, the shape of the laser diode element 500 is rectangular, for example. The laser diode element 500 can emit a plurality of laser beams. These laser beams are ultraviolet light or visible light, for example. The peak wavelength of the laser beams may be 400 nm or more and 550 nm or less, for example. The plurality of laser beams in one laser diode element 500 are the same color, for example. For instance, in a plurality of laser beams in a single laser diode element 500, the difference between the longest peak wavelength and the shortest peak wavelength may be 5 nm or less.

The shape, arrangement, material, and the like of the various members constituting the laser diode element 500 can be the same as what was described in the stacked body preparation step S101. The planned cleavage lines 200 in the stacked body preparation step S101 can be read as either the end face on the light emitting side 71 or the end face on the light reflecting side 72 in the laser diode element 500 in the laser diode element 500. The planned division lines 300 in the stacked body preparation step S101 can be read as the outermost surface of the element. The mode in which the laser diode element 500 is used is not limited to a mode in which the upper surface is facing up as described in this embodiment, and any direction may be facing up.

Light Emitting Device 600

Figure 13:
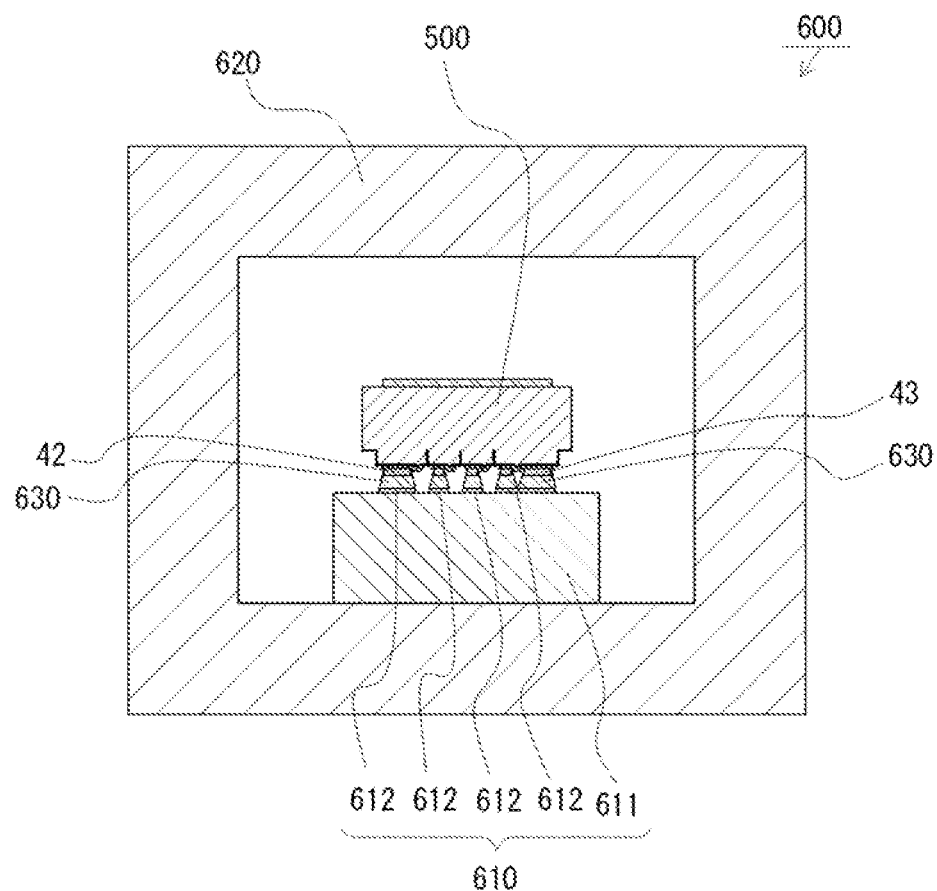
FIG. 13 is a schematic cross-sectional view showing the light emitting device according to an embodiment of the present invention.

FIG. 13 is a schematic cross-sectional view showing the light emitting device according to an embodiment of the present invention. The light emitting device 600 has the laser diode element 500, a support 610, and a package 620. The support 610 is a member to which the laser diode element 500 is fixed and electrically connected, and is, for example, a submount. The support 610 includes a main body 611 and a conductive layer 612 provided on the surface of the main body. The main body 611 is a ceramic or other such insulating member. The second conductive layer 42 of the laser diode element 500 is joined to the conductive layer 612 of the support 610 via a conductive adhesive agent 630. This allows the heat generated by the laser diode element 500 to be dissipated to the support 610 via the second conductive layer 42. Also, the third conductive layer 43 of the laser diode element 500 may be joined to the conductive layer 612 of the support 610 via a conductive adhesive agent 630. This allows the heat generated by the laser diode element 500 to be dissipated to the support 610 via the third conductive layer 43.

The package 620 is made of a conductive material such as metal or the like, or an insulating material such as glass, a ceramic or the like, or a composite material of the two. Part of the package 620 is light transmissive, so as to transmit the laser beam. The laser beam passes through the light-transmissive portion of the package 620 and is emitted outside the light emitting device 600. A wavelength conversion member such as a phosphor or the like may be disposed in the portion of the package 620 through which the laser beam passes. The package 620 airtightly seals the laser diode element 500. The package 620 has an anode and a cathode. The anode of the laser diode element 500 is electrically connected to the anode of the package via a conductive layer, a wire, or the like. The cathode of the laser diode element 500 is electrically connected to the cathode of the package via a conductive layer, a wire, or the like.

Example 1 and Comparative Examples

The laser diode element of Example 1 and the laser diode elements of comparative examples are similar in that they have four protrusions on which one ridge is formed, but the laser diode elements were produced with different first distances D1 and second distances D2. In the laser diode element of Example 1, the first distance D1 and the second distance D2 in the four protrusions were set to 34 µm and 14 µm, respectively. In the laser diode element of the comparative examples, the first distance D1 and the second distance D2 in the four protrusions were set to 87 µm and 14 µm, 34 µm and 24 µm, 24 µm and 34 µm, and 14 µm and 87 µm. In Example 1 and the comparative examples, laser diode elements were obtained by carrying out the cleavage step and the Dividing step under the same conditions.

Evaluation of Threshold Current Value

Figure 14:
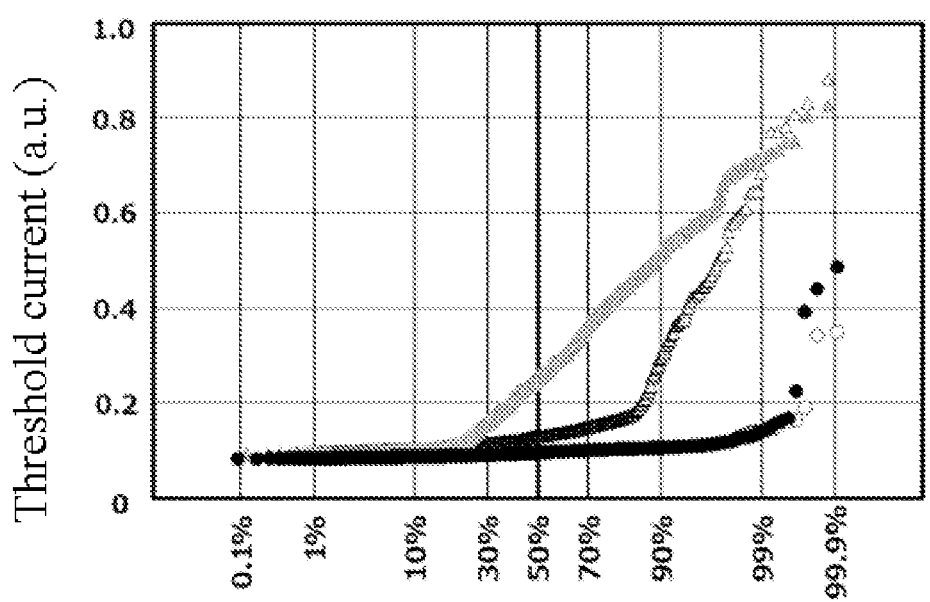
FIG. 14 is a graph of the normal probability distribution of threshold current values in Example 1 and a comparative example.

A plurality of each of the laser diode elements of Example 1 and the comparative examples were produced. For each of the laser diode elements thus obtained, the threshold current value when only the first protrusion was subjected to laser oscillation, and the threshold current value when only the second protrusion was subjected to laser oscillation were measured. FIG. 14 is a graph of the normal probability distribution of the measurement results. In FIG. 14, the data are plotted with the threshold current on the vertical axis and the cumulative probability on the horizontal axis. In FIG. 14, a black circle indicates a first protrusion of Example 1, a white circle indicates a second protrusion of Example 1, a gray triangle indicates a first protrusion of a comparative example, and a white triangle indicates a second protrusion of a comparative example. It can be seen from the results shown in FIG. 14 that there are more samples in which the difference between the threshold current values of the first protrusion and the second protrusion is small in Example 1 than in the comparative examples. It is presumed that this result was obtained because the difference in the shape of the surfaces emitting the laser light of the first protrusion and the second protrusion was smaller in Example 1 than in the comparative examples. Because of this, it can be said that making the first distance D1 equal reduces variance in the characteristics of the plurality of laser beams corresponding to the plurality of ridges. It can also be seen from FIG. 14 that variance in the threshold current values of the plurality of laser diode elements in Example 1 is smaller than the variance of the threshold current values of the plurality of laser diode elements in the comparative examples. Because of this, it can be said that variance among the plurality of laser diode elements can be reduced by making the first distance D1 equal.

Example 2

As shown in FIG. 7A, a plurality of the laser diode elements of Example 2 were produced in the same manner as in Example 1 except that an island portion was provided between the second inner portion and the planned cleavage line.
Evaluation of FFP
First, in the plurality of laser diode elements of Example 1, the size of ripple in the FFP of the laser light emitted from each protrusion was checked, and any in which the size of ripple at or above a specific value was judged to have ripple. In the plurality of laser diode elements of Example 1, the incidence of the occurrence of ripple was calculated for each protrusion, the incidence of ripple was found to be the highest in the second protrusion. Next, in the plurality of laser diode elements of Example 2, the size of ripple in the FFP of the laser light emitted by the second protrusion was checked, and it was determined whether or not there was ripple by the same criterion as for the laser diode elements of Example 1. As a result, none of the laser diode elements of Example 2 was determined to have ripple in the laser light of the second protrusion.

The above is a description of the embodiments of the invention with reference to specific examples. However, the invention is not limited to these specific examples. All forms that can be designed and modified by those skilled in the art based on the above-described embodiments of the invention are also within the scope of the invention as long as they encompass the gist of the invention. In addition, within the scope of the idea of the invention, those skilled in the art can conceive of various changes and modifications, and it is understood that these changes and modifications also fall within the scope of the invention.

The laser diode element described in the embodiments can be used, for example, as a light source for projectors, vehicle headlights, head-mounted displays, special lighting, displays, and the like.

REFERENCE SIGNS LIST

11: nitride semiconductor substrate; 12: first conductivity type semiconductor layer; 13: active layer; 14: second conductivity type semiconductor layer; 20: protrusion; 20a: first protrusion; 20b: second protrusion; 20c: intermediate protrusion; 21: first side surface; 21a: first side; 21b: second side; 22: second side surface; 23: ridge; 24a: first outer portion; 24b: second outer portion; 24c: first inner portion; 24d: intermediate portion; 25a: third outer portion; 25b: fourth outer portion; 25c: second inner portion; 25d: intermediate portion; 26, 27: island portion; 26a: first portion; 26b: second portion; 30: insulating film; 31: first insulating film; 32: second insulating film; 41: first conductive layer; 42: second conductive layer; 43: third conductive layer; 50: upper electrodes; 60: lower electrode; 71: light emitting side; 72: light reflecting side; 72: light reflecting side; 100: stacked body; 200: planned cleavage line; 300: planned division line; 400: element region; 500: laser diode element; 600: light emitting device; 610: support; 611: main body; 612: conductive layer; 620: package; and 630: conductive adhesive agent.

The invention claimed is:
1. A method for manufacturing a laser diode element, comprising:
   preparing a stacked body including
      a nitride semiconductor substrate,
      a first conductivity type semiconductor layer provided on the nitride semiconductor substrate,
      an active layer provided on the first conductivity type semiconductor layer, and
      a second conductivity type semiconductor layer provided on the active layer, wherein
      the stacked body includes a plurality of element regions that are defined by a plurality of planned cleavage lines and a plurality of planned division lines intersecting the planned cleavage lines, in a top view,
      the stacked body defines a plurality of protrusions disposed in at least one of the element regions, each of the protrusions including
         a first side surface and a second side surface each extending between adjacent ones of the planned cleavage lines, and
         a ridge that is disposed between the first side surface and the second side surface in the top view,
            with a lengthwise direction of the ridge intersecting the planned cleavage lines,
      a lower end of the first side surface and a lower end of the second side surface are located below a lower surface of the active layer,
      in at least one of the protrusions, a first distance on one of the planned cleavage lines from the first side surface to the ridge is different from a second distance on the one of the planned cleavage lines from the second side surface to the ridge, in the top view, and
      the first distance is the same for all of the protrusions in the at least one of the element regions;
   cleaving the stacked body along the planned cleavage lines, wherein the cleaving proceeds from the first side surface to the second side surface at each of the protrusions; and
   dividing the stacked body along the planned division lines, wherein
      the protrusions in the at least one of the element regions have a first protrusion which is located on a side where the cleavage begins, a second protrusion which is located on a side where the cleavage ends, and one or more intermediate protrusions which are located between the first protrusion and the second protrusion, in the top view, each of the protrusions has a first region between the first side surface and the ridge, and a second region between the second side surface and the ridge,
the first region of the first protrusion has a first outer portion through which one of the planned cleavage lines passes, a second outer portion through which an adjacent one of the planned cleavage lines passes, and a first inner portion located between the first outer portion and the second outer portion,
each of the first inner portion, the first outer portion and the second outer portion has a width in the direction extending along at least one of the planned cleavage lines, and
the width of the first inner portion is greater than each of the width of the first outer portion and the width of the second outer portion.

2. The method for manufacturing a laser diode element according to claim 1, wherein the first distance is greater than the second distance in the at least one of the protrusions.

3. The method for manufacturing a laser diode element according to claim 1, wherein
the at least one of the element regions includes a plurality of first conductive layers electrically connected to the second conductivity type semiconductor layer, each of the first conductive layers being disposed above the ridge and the first region of a respective one of the protrusions.

4. The method for manufacturing a laser diode element according to claim 3, wherein the at least one of the element regions includes a plurality of second conductive layers disposed above the first conductive layers, and electrically connected to the first conductive layers, respectively,
each of the second conductive layers and the first conductive layers has a width in a direction extending along at least one of the planned cleavage lines, and
the width of each of the second conductive layers is less than the width of each of the first conductive layers.

5. The method for manufacturing a laser diode element according to claim 4, wherein one of the first conductive layers disposed above the second protrusion is also disposed above the second region of the second protrusion, and
the at least one of the element regions includes a third conductive layer disposed above the second region of the second protrusion.

6. The method for manufacturing a laser diode element according to claim 1, wherein
the second region of the second protrusion has a third outer portion through which one of the planned cleavage lines passes, a fourth outer portion through which an adjacent one of the planned cleavage lines passes, and a second inner portion located between the third outer portion and the fourth outer portion,
each of the second inner portion, the third outer portion and the fourth outer portion has a width in the direction extending along at least one of the planned cleavage lines, and
the width of the second inner portion is greater than each of the width of the third outer portion and the width of the fourth outer portion.

7. The method for manufacturing a laser diode element according to claim 6, wherein the stacked body further defines an island portion in the at least one of the element regions, the island portion being spaced apart from the second protrusion and located between the second inner portion and at least one of the planned cleavage lines in the top view.

8. The method for manufacturing a laser diode element according to claim 7, wherein the island portion includes a first portion and a second portion which is spaced apart from the first portion and is located between the first portion and the second inner portion in the top view.

9. The method for manufacturing a laser diode element according to claim 1, wherein the first conductivity type semiconductor layer, the active layer, and the second conductivity type semiconductor layer include a group III nitride semiconductor.

10. A laser diode element comprising:
a stacked body including
a nitride semiconductor substrate,
a first conductivity type semiconductor layer provided on the nitride semiconductor substrate,
a plurality of active layers provided on the first conductivity type semiconductor layer,
a plurality of second conductivity type semiconductor layers respectively provided on the active layers, wherein
the stacked body defines an end face on the light emitting side and an end face on the light reflecting side,
the stacked body defines a plurality of protrusions each including
a first side surface and a second side surface extending between the end face on the light emitting side and the end face on the light reflecting side, and
a ridge disposed between the first side surface and the second side surface in a top view, with a lengthwise direction of the ridge intersecting the end face on the light emitting side,
in each of the protrusions, a lower end of the first side surface and a lower end of the second side surface are located below a lower surface of the active layer,
in each of the protrusions, in the top view, a first distance from the first side surface to the ridge at the end face on the light emitting side is different from a second distance from the second side surface to the ridge at the end face on the light emitting side,
the first distance is the same for all of the protrusions,
the plurality of the protrusions have a first protrusion, a second protrusion and one or more intermediate protrusions which are located between the first protrusion and the second protrusion,
in the top view, the first protrusion has a first region between the first side surface and the ridge, and a second region between the second side surface and the ridge,
in the top view, the first region of the first protrusion has a first outer portion including the end face on the light emitting side, a second outer portion including the end face on the light reflecting side, and a first inner portion located between the first outer portion and the second outer portion,
each of the first inner portion, the first outer portion and the second outer portion has a width in the direction extending along the end face on the light emitting side, and
the width of the first inner portion is greater than each of the width of the first outer portion and the width of the second outer portion.

11. The laser diode element according to claim 10, wherein the first distance is greater than the second distance.

12. The laser diode element according to claim 10, wherein the stacked body further defines an island portion spaced apart from the second protrusion and located between the second inner portion and the end face on the light emitting side in the top view.

13. The laser diode element according to claim 10, wherein the first conductivity type semiconductor layer, the active layer, and the second conductivity type semiconductor layer include a group III nitride semiconductor.

14. A laser diode element comprising:
- a stacked body including
  - a nitride semiconductor substrate,
  - a first conductivity type semiconductor layer provided on the nitride semiconductor substrate,
  - a plurality of active layers provided on the first conductivity type semiconductor layer,
  - a plurality of second conductivity type semiconductor layers respectively provided on the active layers, wherein
- the stacked body defines an end face on the light emitting side and an end face on the light reflecting side,
- the stacked body defines a plurality of protrusions each including
  - a first side surface and a second side surface extending between the end face on the light emitting side and the end face on the light reflecting side, and
  - a ridge disposed between the first side surface and the second side surface in a top view, with a lengthwise direction of the ridge intersecting the end face on the light emitting side,
- in each of the protrusions, a lower end of the first side surface and a lower end of the second side surface are located below a lower surface of the active layer,
- in each of the protrusions, in the top view, a first distance from the first side surface to the ridge at the end face on the light emitting side is different from a second distance from the second side surface to the ridge at the end face on the light emitting side,
- the first distance is the same for all of the protrusions,
- the plurality of the protrusions have a first protrusion, a second protrusion and one or more intermediate protrusions which are located between the first protrusion and the second protrusion,
- in the top view, the second protrusion has a first region between the first side surface and the ridge, and a second region between the second side surface and the ridge,
- in the top view, the second region of the second protrusion has a third outer portion including the end face on the light emitting side, a fourth outer portion including the end face on the light reflecting side, and a second inner portion located between the third outer portion and the fourth outer portion,
- each of the second inner portion, the third outer portion and the fourth outer portion has a width in a direction extending along the end face on the light emitting side, and
- the width of the second inner portion is greater than each of the width of the third outer portion and the width of the fourth outer portion.

15. The laser diode element according to claim 14, wherein the first distance is greater than the second distance.

16. The laser diode element according to claim 14, wherein the stacked body further defines an island portion spaced apart from the second protrusion and located between the second inner portion and the end face on the light emitting side in the top view.

17. The laser diode element according to claim 14, wherein the first conductivity type semiconductor layer, the active layer, and the second conductivity type semiconductor layer include a group III nitride semiconductor.

\* \* \* \* \*